United States Patent [19]

Miller et al.

[11] Patent Number: 4,705,212

[45] Date of Patent: Nov. 10, 1987

[54] METHOD AND APPARATUS FOR MANAGING STEAM SYSTEMS

[75] Inventors: Charles E. Miller; Robert L. Poland, both of Boulder; Louis T. Yoshida, Longmont, all of Colo.

[73] Assignee: Engineering Measurements Co., Longmont, Colo.

[21] Appl. No.: 565,362

[22] Filed: Dec. 27, 1983

[51] Int. Cl.$^4$ .............................................. F16T 1/02
[52] U.S. Cl. ...................................... 236/54; 137/171; 230/84
[58] Field of Search ...................... 236/84, 53, 54, 55, 236/68 D, 80 R; 237/68; 236/80 F; 251/30; 137/171, 197

[56] References Cited

U.S. PATENT DOCUMENTS

| | | | |
|---|---|---|---|
| 2,531,824 | 11/1950 | Paille | 236/80 F X |
| 2,757,870 | 8/1956 | Velan | 236/54 |
| 3,151,660 | 10/1964 | Evraets | 236/8r UX |
| 3,371,865 | 3/1968 | Ross et al. | 237/68 |
| 3,489,350 | 1/1970 | Caparone | 236/84 X |
| 3,526,360 | 9/1970 | Ray | 236/80 F X |
| 3,603,504 | 9/1971 | Stang, Jr. | 236/84 X |
| 3,810,578 | 5/1974 | Matthews | 236/84 X |
| 4,484,453 | 11/1984 | Niess | 62/195 |

Primary Examiner—William E. Wayner
Attorney, Agent, or Firm—James R. Young

[57] ABSTRACT

A steam system management method and apparatus includes a condensate collection reservoir with a pilot operated, pressure actuated dump valve that has a quick, snap action fully open/fully closed mode of operation. The pilot operation of the dump valve is actuated by a very low voltage solenoid actuator powered by a thermal-electric generator which thermionically converts heat from the steam system directly to electricity. Condensate dumps are controlled by liquid level sensing switches positioned near the top and bottom of the reservoir and electrically connected to a relay logic that turns the solenoid on and off. Temperature sensors positioned in the steam system and adjacent the thermal-electric generator are utilized in combination with the thermal electric generator and a microprocessor to monitor the air content in the steam system and to open the dump valve to purge excess air from the steam system. A voltage converter and voltage regulator are provided to convert very low voltage output from the thermal-electric generator to a higher voltage necessary to operate the microprocessor, and management information output displays are provided to indicate valve status, modes of operation, quantities of condensate dumped, and failure alarm.

59 Claims, 9 Drawing Figures

METHOD AND APPARATUS FOR MANAGING STEAM SYSTEMS

BACKGROUND OF THE INVENTION

The present invention relates to method and apparatus for managing steam systems, and more specifically, to the method and apparatus for automaticallly monitoring and eliminating condensate and air from steam systems and providing data regarding same.

Steam distribution systems have been used for many years for transferring heat from heat sources, such as conventional boilers and more recently, nuclear reactors, to points where the heat is utilized, such as for manufacturing processes, generating electrical or mechanical power, heating buildings, and other such uses. It is inherent in the nature of steam distribution systems that some of the steam condenses to water as heat of vaporization is lost from the steam by radiation and conduction to the substance or product being heated. Such condensate must be discharged or eliminated from the steam system immediately in order to maintain efficient heat distribution via the steam system because the heat content of condensate is negligible compared to that of steam. The condensate is also valuable, so it is usually returned to the boiler.

It is also inherent in such steam systems for air and non-condensable gases to become entrained in the steam, for example, by introduction into the steam system along with make-up water. Such entrained air and other non-condensables in steam systems also decrease efficiency of heat transfer by depressing obtainable temperatures at desired pressures and, more significantly, by creating a film on the interior heat transfer surfaces which is equivalent to an insulator and inhibits the transfer of heat from the steam to the apparatus or material which is to be heated. Small concentrations of air can dramatically reduce the film coefficient, i.e., inhibit the heat transfer. For example, a 1% concentration of air in a steam system can, in some instances, cause a 50% reduction in the film coefficient. Consequently, it is desirable, if not necessary, to purge steam distribution systems to eliminate air and other non-condensables therefrom.

Devices commonly known as steam traps are available for collecting and dumping condensate from steam systems. They are usually fitted on heat exchanger outlets and are intended to collect and discharge condensate while not permitting steam to escape. However, current steam trap technology prior to this invention does not permit rapid, efficient purging of air and other non-condensables from steam systems. A pervasive problem is that such current technology steam traps are also not very reliable devices for saving live steam either. In large installations with hundreds of steam traps, it is not unusual to find 10% of the traps to be malfunctioning. When a steam trap fails and allows live steam to blow through it and out of the system, it is the ultimate waste of energy in steam systems. It can also cause spoiled products, damage to plant facilities, and other unneeded costs. In most installations, it is estimated that the mean time to detect a "blowing trap" is two weeks.

Conventional steam traps utilize temperature or pressure sensitive elements, such as floats, discs, and the like, to shut off steam flow while intermittently or continuously draining condensate. They can, for the most part, be generally grouped into three categories: thermostatic traps, mechanical buoyancy traps, and thermodynamic traps.

Thermostatic traps use bimetallic elements to open and close condensate drains in response to the difference in temperature between hotter steam and cooler condensate. This type of trap is somewhat wasteful in that it passes live steam, and its operating components are not very durable.

Mechanical buoyancy traps operate on the basis of the density difference between steam and condensate. Floats, which are raised or lowered by the collecting condensate, open valves to remove condensate when the trap is full and close valves after the traps are emptied. These traps cannot pass non-condensable gas, such as air, under normal operating conditions. They can vapor lock, and they cannot be used in freezing environments. Also, this kind of mechanism tends to throttle the valve as it begins to close, allowing cutting and erosion in the valve that can ultimately result in valve failure that allows live steam to escape.

In a thermodynamic trap, pressure in the trap inlet pushes up a disc to allow discharge of condensate. Then, when hot steam and condensate reach the trap, the high velocity flow past the disc tends to reduce pressure under the disc allowing some condensate to flash. The flashing condensate over the disc forces it shut. This type of trap is also wasteful in that it allows passage of live steam therethrough during each condensate dump cycle. Also, high back pressure associated with these traps can affect their cycle rate.

Consequently, there remains a need in the industry for more efficient and effective steam management apparatus for collecting and disposing of condensate from steam distribution systems with durable and dependable valve mechanisms. There is also a need for a method and apparatus capable of automatically purging the air when some predetermined maximum acceptable level of air in the system is reached. It is also desireable to provide steam system management apparatus which allows the maintenance personnel to monitor the performance of the steam distribution system, the amount of condensate eliminated from the system, warning alarms for malfunctioning dump valves, and displays indicating condensate dumps, fills, air purges, and the like. Another feature that is needed is a reliable system for providing accurate data on the volume of condensate dumped from the steam system.

One of the impediments to developing more sophisticated steam system control and management apparatus is that the use of electronics for operating such apparatus could be hazardous. Often steam traps are positioned in tunnels or subbasements where potentially explosive gasses can accumulate and where the use of electrical equipment could create sparks that could set off an explosion. Also, electrical power is not always available where steam traps are located.

SUMMARY OF THE INVENTION

Accordingly, it is an object of the present invention to provide steam system management method and apparatus for efficiently, effectively, and dependably collecting condensate from the steam system and discharging the condensate through a snap-action, full open/full closed valve mechanism.

It is also an object of the present invention to provide such a method and apparatus that is electronically operated by a very low voltage electronic control system that is incapable of producing sparks.

It is also an object of the present invention to provide such a method and appparatus in which low voltage electricity is produced thermionically by directly converting heat from the steam distribution system into electricity for use in its operating and control components.

It is also an object of the present invention to provide such a method and apparatus that is also capable of monitoring the amount of air in the steam distribution system and automatically purging the air from the system.

It is also an object of the present invention to provide such a method and apparatus that includes alarm features for notifying maintenance personnel of malfunctions resulting in uncontrolled discharge of steam from the steam distribution system, metering devices for recording and collecting data on quantities of condensate eliminated from the system, and operating indicators for maintenance personnel indicating when the apparatus is in a fill mode, dump mode, or air purge mode.

It is also an object of the present invention to provide such a method and apparatus that operates efficiently and dependably over long periods of time using low voltage power generated by thermionics.

A still further object of the present invention is to provide such a system that performs the objects recited above on approximately one (1) volt electric power that is thermionically generated under operating conditions of steam pressures up to 600 psi and steam temperatures to 600 degrees Fahrenheit.

The steam system management method and apparatus of the present invention includes a device comprised of a reservoir for containing condensate with an inlet connected to a steam distribution pipe and an outlet for dumping condensate and entrained air into an appropriate condensate gathering or disposal system, a pilot-actuated main valve in the outlet which is opened and closed by steam pressure, and a solenoid-actuated pilot control valve for controlling the pressure applied to the main valve. The main valve is constructed in such a manner that it snaps almost instantaneously to a full open or full closed position. The pilot valve, which controls the pressure applied to the main valve, is actuated by a low voltage solenoid which derives its electric power from a thermal electric generator positioned adjacent the inlet of the reservoir and which converts heat from the steam distribution system directly into electricity. It is preferable that the thermal-electric generator produce approximately one (1) volt of electricity and that the solenoid is capable of actuating the pilot valve effectively and efficiently on approximately one (1) volt of electric power.

The pressure for operating the main valve is derived from the outlet upstream of the main valve and is applied to a piston on the main valve that has a cross-sectional area greater than the outlet opening in the main valve. A filter is positioned in the outlet to prevent solid or particulate matter in the condensate or steam from entering the main valve pressure drive system. A bleed conduit and bleed valve are also provided to bleed pressure off the main valve piston to facilitate quick opening of the main valve.

A high temperature control device is positioned between the thermal-electric generator and the heat source at the inlet of the reservoir to limit the temperature at the thermal-electric generator, which is necessary to prevent high temperatures from damaging the structure of the thermal-electric generator. A heat sink is positioned adjacent the thermal-electric generator on the opposite side of the heat source for dissipating heat from the thermal-electric generator into the atmosphere and maintaining temperature differential across the thermal-electric generator.

The solenoid that controls the pilot valve is actuated through relays which open and close the electric circuit from the thermal-electric generator to the solenoid. The relays are actuated by upper and lower fluid level sensor switches positioned in the reservoir.

The system also includes a microprocessor which is programmed to monitor the amount of air in the system, and, when the amount of air reaches a predetermined maximum acceptable level, the microprocessor actuates a relay in the solenoid electric circuit to open the main valve for purging the air from the system. In this mode, the main valve remains open, allowing condensate, steam and air to blow through the reservoir and out of the outlet until the level of air is decreased to some predetermined acceptable level. The amount of air in the steam system is monitored by monitoring the thermal transfer efficiency from the steam in the inlet to the heat sink, which is directly related to a film on the heat transfer surface that varies in proportion to the amount of air in the steam system. This thermal transfer efficiency is monitored by constantly measuring the temperature difference between the trap inlet and the heat sink on opposite sides of the thermal electric generator in the form of an electric signal that varies in direct proportion with this temperature difference and comparing this signal with the electricity produced by the thermal electric generator, which varies directly with the actual heat transfer. During the air purge, the microprocessor continuously calculates the rate of change of the thermal transfer efficiency, and when the rate of change decreases to a predetermined standard rate corresponding with an acceptable minimum amount of air, it outputs a signal to the relay to close the main valve. The thermal transfer efficiency at which the main valve is closed is stored as a reference, and the microprocessor then continuously compares this reference thermal transfer efficiency with the actual thermal transfer efficiency of the steam system. When the actual thermal transfer efficiency varies a predetermined percentage from the reference thermal transfer efficiency that corresponds to an unacceptable amount of air in the system, the microprocessor outputs a signal to actuate the relay to cut the electric power to the solenoid and open the valve to initiate a purge.

The electronic control circuit also includes a totalizer for keeping track of the amount of condensate eliminated from the system, an alarm for notifying maintenance personnel of a malfunction of the main valve and monitoring displays for the fill, dump, and air purge modes. While the solenoid operates on approximately one (1) volt electric current produced by the thermal-electric generator, the microprocessor requires about five (5) volts to operate. Therefore, the electronic circuit includes an electronic voltage converter for converting voltage from one (1) volt to five (5) volts, and an electronic voltage regulator for regulating the output voltage at a maximum of five (5) volts.

BRIEF DESCRIPTION OF THE DRAWINGS

Other objects, advantages, and capabilities of the present invention will become more apparent as the description proceeds taken in conjunction with the following drawings in which.

DESCRIPTION OF THE PREFERRED EMBODIMENTS

Figure 1:
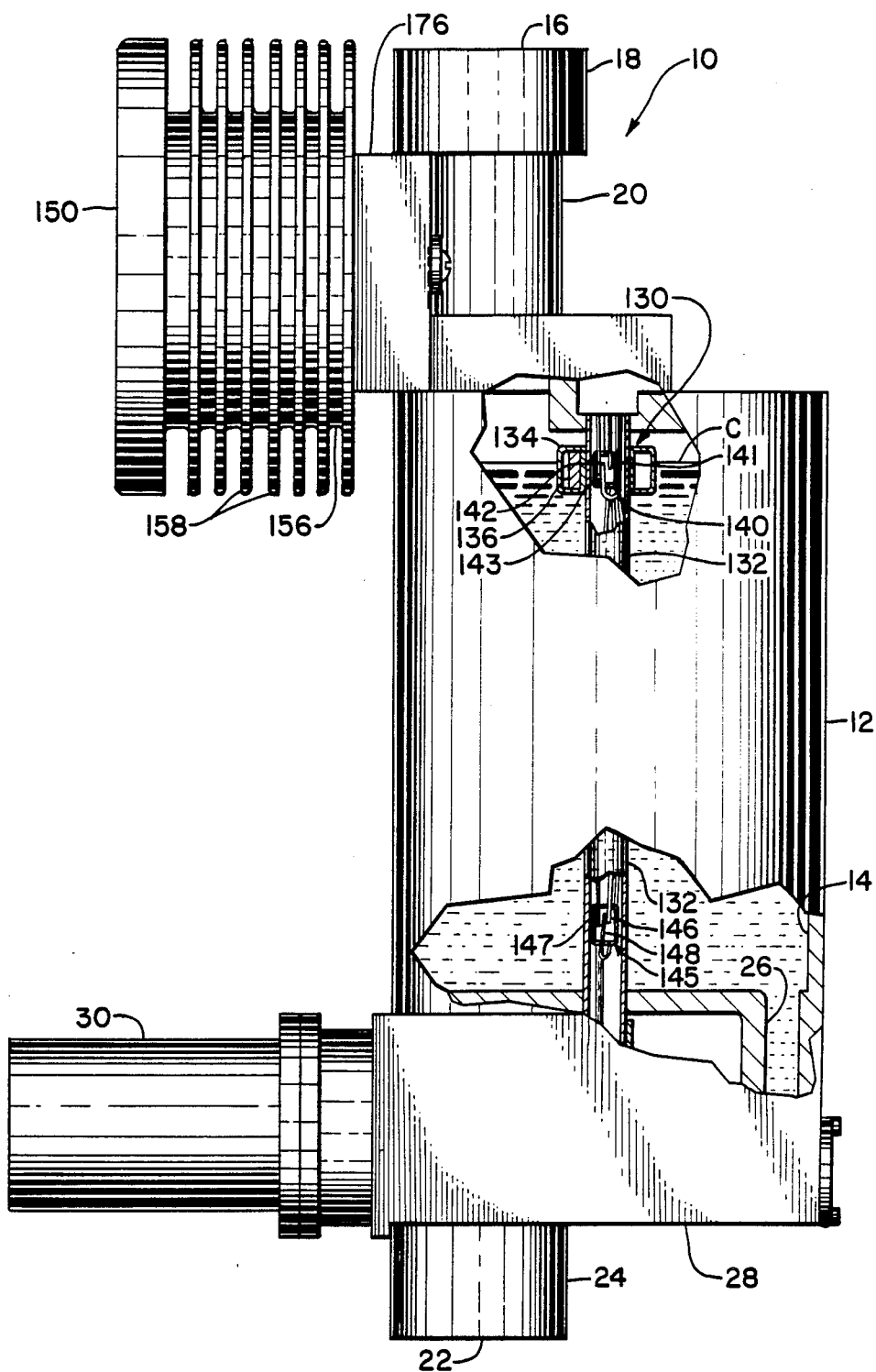
FIG. 1 is a plan view of the steam system management apparatus of the present invention with portions of the reservoir cut away to reveal the level sensor switches.
Figure 2:
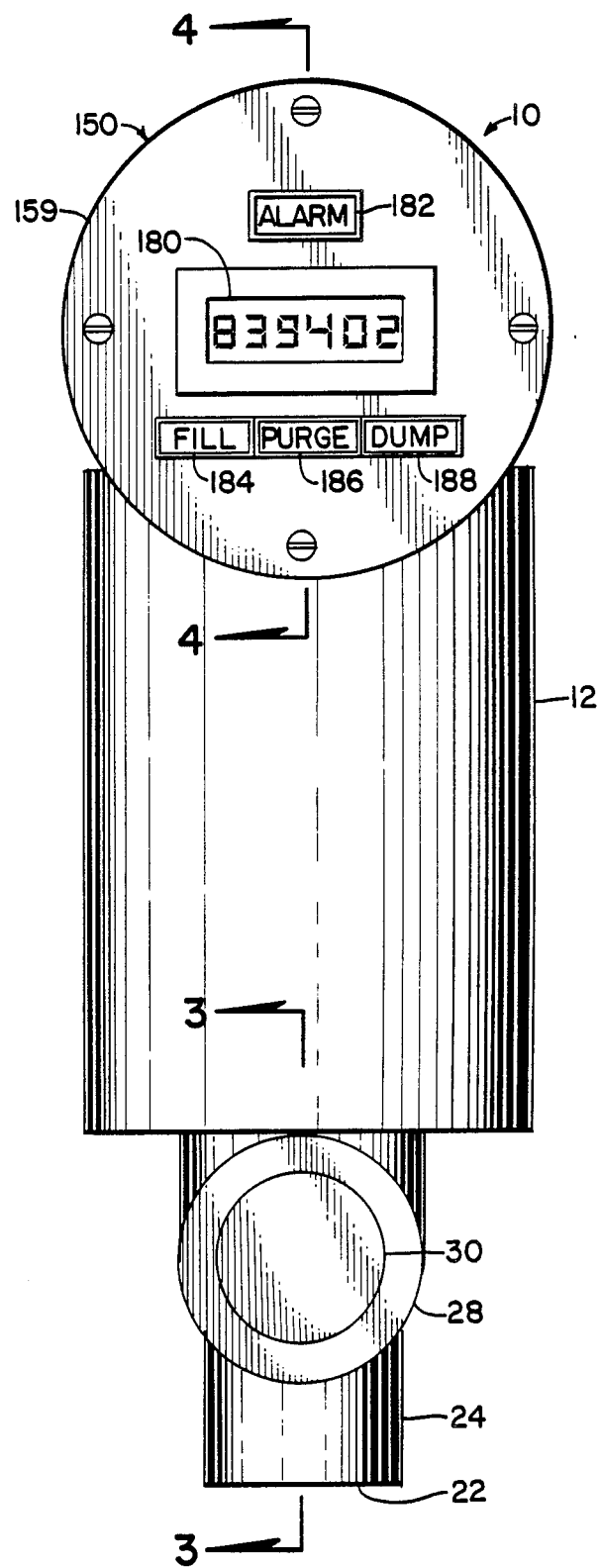
FIG. 2 is a front plan view of the steam system management apparatus of the present invention.

The steam system management apparatus 10 of the present invention as shown in FIGS. 1 and 2 is comprised of a reservoir 12 for collecting and containing condensate W from a steam distribution system (not shown). The inlet 16 includes a conventional pipe fitting 18 adapted for connecting the apparatus 10 to the steam system. An inlet tube 20 leads from the inlet 16 to the interior 14 of the reservoir 12. An outlet tube 26 at the bottom of the reservoir 12 leads to an outlet 22 having a conventional pipe fitting 24 adapted for connecting the outlet to any appropriate condensate gathering or disposal system or to a drain. A valve housing 28 encloses a portion of the outlet tube 26 that contains the main dump valve, which will be described in more detail below. The solenoid housing 30 encloses an electric solenoid used for operating the dump valve, as will also be described in more detail below.

An electronic generator and control assembly 150 is fastened to the inlet tube 220 above the reservoir 12. This electronic generator and control assembly 150 is comprised of a thermal-electric generator that utilizes the principle of thermionics to convert heat directly to electric power, an upper temperature control device that limits the amount of heat delivered to the thermal-electric generator, and the electronic control circuit and microprocessor necessary for operating the apparatus, all of which will be described in more detail below.

Essentially, condensate W from a steam distribution system enters the reservoir 12 through the inlet 16 and inlet tube 20. While the main valve is closed, the reservoir 12 fills with condensate W. When the reservoir 12 is full, as shown in FIG. 1, the main valve in the outlet is opened automatically to dump the condensate W from the reservoir 12 through the outlet tube 26 and outlet 22 into an appropriate condensate collection or disposal system (not shown). When the reservoir 12 is almost empty, the main valve is closed and the reservoir starts to fill with condensate again. In this dump mode, the reservoir 12 is not dumped completely empty. A condensate W barrier is maintained at the bottom of the reservoir 12 to prevent live steam from blowing through the reservoir 12 and out of the outlet 22. A totalizer display 180, as shown in FIG. 2, is utilized to keep track of the total volume of the cndensate W dumped.

The electronic generator and control assembly 150 also includes the appropriate apparatus and electronic circuits to automatically initiate a purge mode to purge excess, unwanted air from the steam system. This apparatus and circuitry will be described in more detail below; however, suffice it to say at this point that a purge mode is initiated when too much air is detected in the steam system. The purge is terminated when the amount of air in the system is reduced to some predetermined acceptable amount. In the purge mode, the main valve is opened to dump all the condensate W from the reservoir, and it is allowed to remain open while steam and air blow through the reservoir and out the outlet for a sufficient period of time to purge the steam system of the excess air. At that point, the main valve is closed, and the system is back in the fill mode wherein condensate W is again collected in the reservoir 12. As shown in FIG. 2, this device 10 includes visual displays 184, 186, 188 to indicate whether the device is in a fill mode, purge mode, or dump mode. It also includes a visual alarm 182 which is programmed to come on when the main valve malfunctions and remains open for an excessive period of time.

Figure 3:
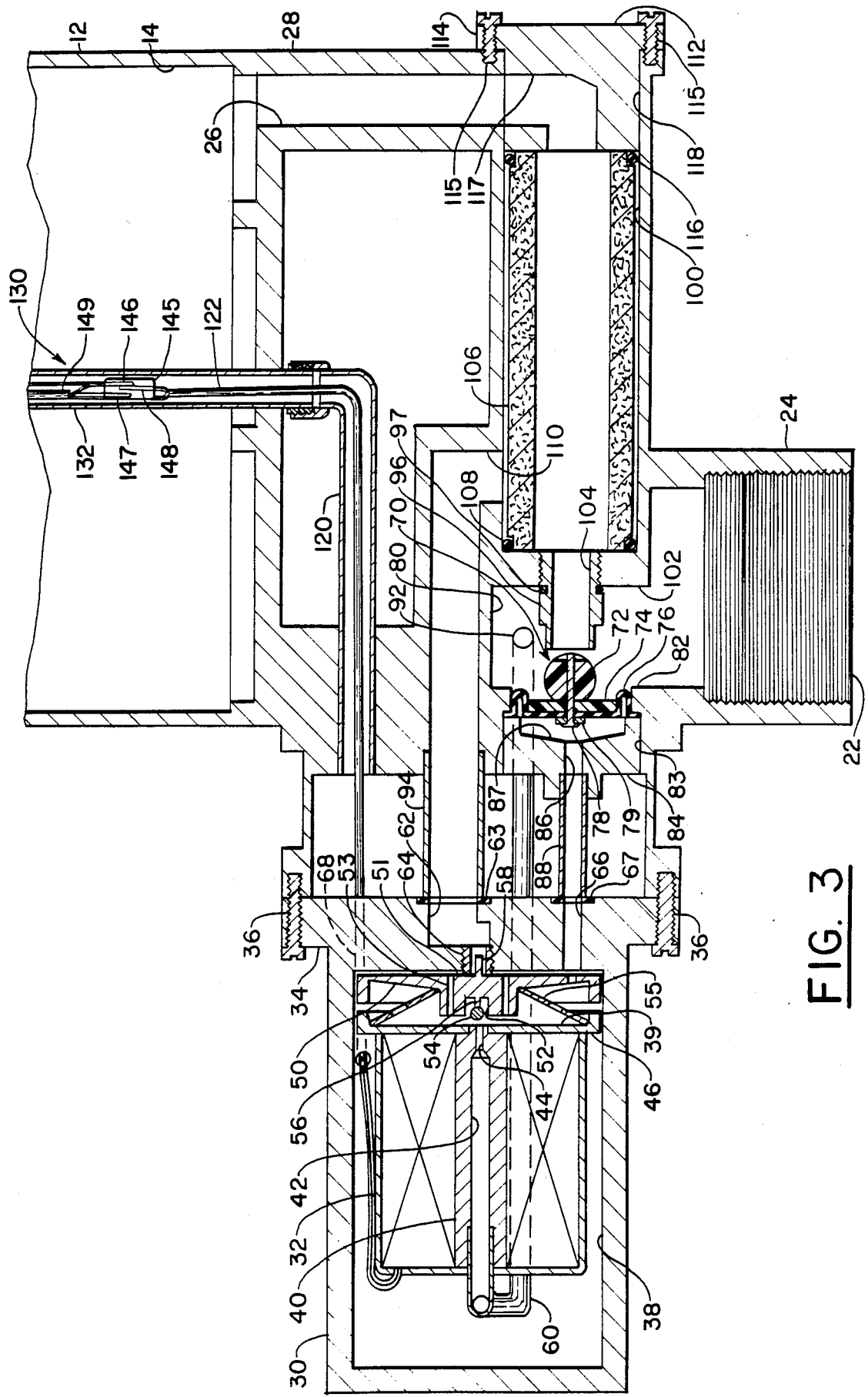
FIG. 3 is an enlarged cross-sectional view of the bottom of the reservoir and the valve mechanism of the steam system management apparatus of the present invention taken along lines 3—3 of FIG. 2 and showing the main valve in open position.
Figure 4:
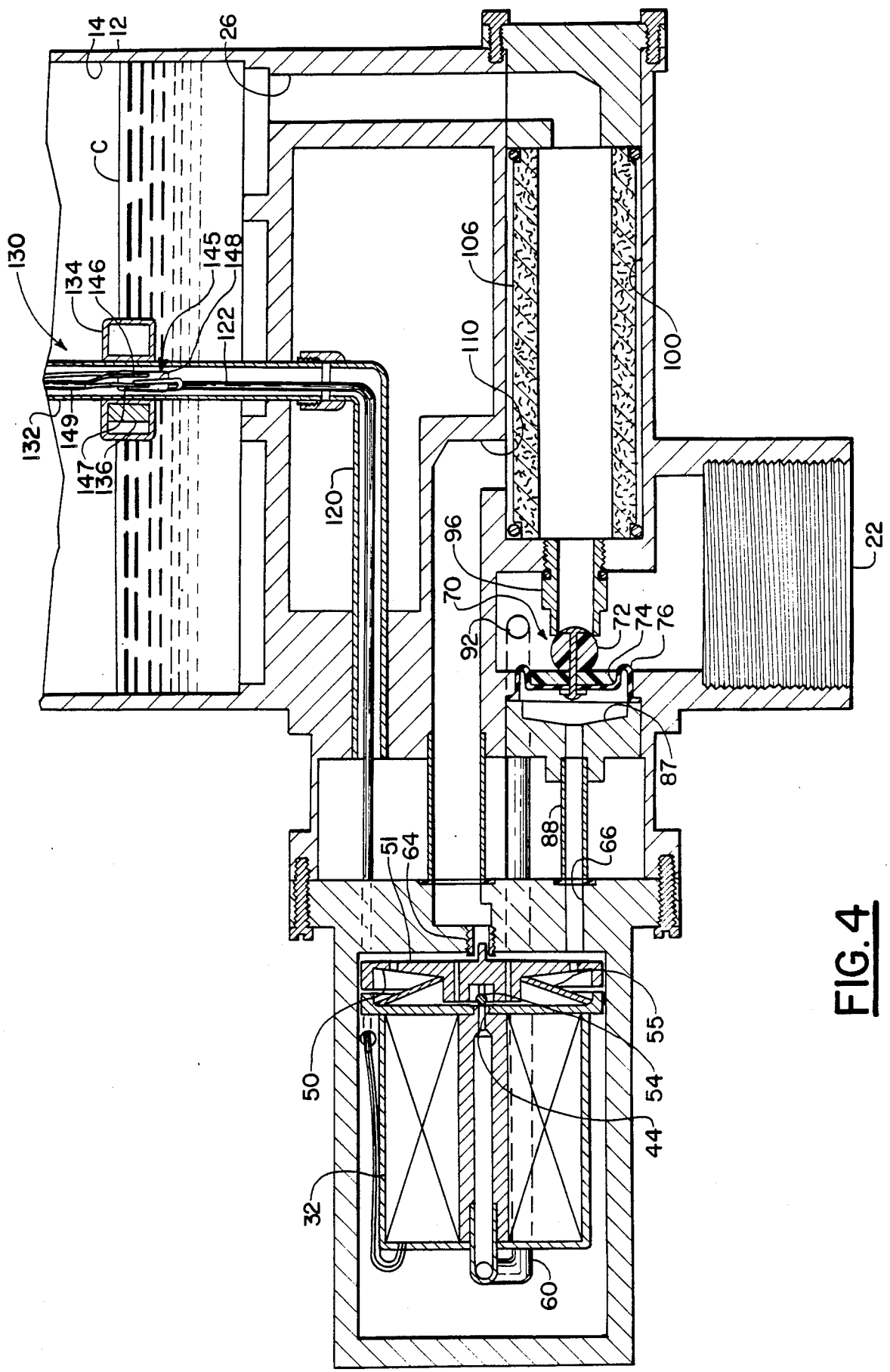
FIG. 4 is a cross-sectional view of the valve mechanism similar to FIG. 3 except with the main valve in the closed position.

A more detailed description of the structure and operation of the main valve 70 is made with reference to FIGS. 3 and 4 in addition to FIG. 1. The outlet tube 26 extends downwardly from the reservoir 12 and then laterally into a filter chamber 100 in the valve body 28. An outlet nozzle 96 extends through the end wall 102 of filter chamber 100 into the valve cavity 80. The main valve 70 is positioned in the valve cavity 80 and is adapted to open and close the outlet nozzle 96. The outlet 22 is connected to the valve cavity 80 so that any fluids that escape from the outlet nozzle 96 into the valve cavity 80 can flow out the outlet 22.

The main valve 70 is comprised of a ball stopper 72 fastened to a rigid wafer-shaped piston member 74 by pin 78. The ball stopper 72 is adapted to seat in the outlet end of nozzle 96 to close the outlet and prohibit any fluids from flowing therefrom. The piston 74 is positioned between shoulder 82 in the valve housing 28, and a flexible membrane 76 extends across the back of the piston 74 and radially outward into sealing engagement with the shoulder 82 to form a moveable diaphragm. A plug 84 is positioned in bore 83 of valve housing 28 in such a manner as to squeeze the peripheral surfaces of the membrane 76 against the shoulder 82. In this manner, an enlarged diaphragm chamber 87 in plug 84 is sealed from the valve cavity 80.

The cross-sectional area of the chamber 87 and the exposed cross-sectional area of the piston 74 and membrane 76 is significantly larger than the cross-sectional area of the nozzle 96. Consequently, when a pressure equal to the fluid pressure in the outlet nozzle 96 is applied to the piston 74 in diaphragm chamber 87, the force differential will cause the ball stopper 72 to seat in the outlet of nozzle 96 and remain there to prohibit any fluids in the reservoir 12 from being discharged out the outlet 22. The conduits and apparatus for applying and controlling the pressure applied to the main valve 70 in diaphragm chamber 87 will be described below. The nozzle 96 is screwed into the threaded bore 104 and the filter housing end wall 102, and an O-ring seal 97 is positioned around the periphery of the nozzle 96 to seal the fluid chamber 100 from the valve cavity 80.

A steam supply duct 110 connected with the filter cavity 100 is used to draw pressurized fluid from the outlet upstream of the main valve 70 for delivery to the diaphragm chamber 87 behind the piston 74 and membrane 76 of the main valve 70. A tube 94 extending between the valve housing 28 and solenoid housing 30 connects the supply duct 110 with a corresponding supply duct 62 in the solenoid housing 30. A nozzle 64 screwed into the solenoid housing 30 connects the supply duct 62 with an amrature chamber 39 in the forward portion of the interior 38 of the armature housing 30. The valve duct 66 in the armature housing, axial bore 86 in plug 84, and interconnecting valve tube 88 connect the diaphragm chamber 87 with the armature chamber 39. The armature housing 30 is fastened to the valve housing 28 by screws 36, which when tightened into position, abutt the tubes 88, 94 against the respective seals 67, 63 to prevent leaks of the pressurized fluid in the supply ducts, tubes, and valve conduits. Therefore, there is a direct connection for directing pressure from the filter chamber 100 through supply duct 110, tube 94, supply duct 62, armature chamber 39, valve duct 66, tube 88, and bore 86 into the diaphragm chamber 87.

An armature 50 is positioned in the armature chamber 39 between a solenoid stater plate 46 on one side of armature chamber 39 and the nozzle 64 on the other side of the armature chamber 39. A spring steel conical armature spring 55 is positioned between the armature 50 and the stater plate 46 to bias the armature 50 so that its front face 51 is seated against the nozzle 64 to close it. A pin 58 protrudes from the face 51 of armature 50 into the bore of the nozzle 64 to guide the movement of the armature 50 and maintain it in place as it moves back and forth within the armature chamber 39.

An electric solenoid 32 would around a core 40 and positioned adjacent the stater plate 46 operates to pull the armature 50 against the bias of spring 55 away from the nozzle 64 when the solenoid 32 is energized. When the face 51 of armature 50 is seated against the nozzle 64, fluid under pressure in supply duct 62 is prevented from entering the armature chamber 39, thus it is also prevented from flowing to the diaphragm chamber 87. However, when the solenoid 32 is energized and the armature 50 is pulled away from the nozzle 64, fluid under pressure in supply duct 62 can flow through the armature chamber 39 and into the diaphragm chamber 87 to act on the piston 74 of main valve 70. Consequently, the armature 50 and nozzle 64 operate as a pilot valve in the pressure supply duct to control the fluid pressure that operates the main valve 70.

A pressure bleed system is also provided to bleed pressure from the armature chamber 87 when the solenoid 50 is seated against the nozzle 64 to enhance quick opening of the main valve 70. This pressure bleed system is comprised of an axial bore 42 through the solenoid core 40, which is connected to the armature chamber 39 by a smaller bore 44. A vent duct 60 extends from the bore 42 to the valve cavity 80 downstream of the main valve 70.

A bleed valve in the armature chamber 39 is formed by a ball 54 positioned in a cavity 52 in the opposite side of the armature 50 from the nozzle 64. A stub finger 56 in the cavity 52 operates to push the ball 54 against the opening of bore 44 in core 40 when the solenoid 32 pulls the armature 50 away from the nozzle 64 toward the stater plate 46. Likewise, when the armature 50 moves into seating engagement with the nozzle 64, the ball 54 moves away from the opening into bore 44, thereby opening the armature chamber 39 to the vent 60. Consequently, as soon as the armature 50 shifts rightward against nozzle 64 to shut off the pressure in duct 62, the ball 54 moves away from the bore 44 allowing the pressure in diaphragm chamber 87 to bleed into valve cavity 80. The armature 50 has several holes 53 extending therethrough to facilitate quick, uninhibited bleeding of pressure from diaphragm 87 to vent 60. As mentioned above, this feature allows immediate and quick, snap action opening of the main valve 70 from the nozzle 96. Likewise, when the main valve 70 is to be closed, and the solenoid 32 pulls the armature 50 away from nozzle 64, the ball 54 plugs the bore 44 so that pressure from duct 62 is immediately directed to the diaphragm chamber 87 and applied against the piston 74 to quickly snap the main valve 70 closed against the nozzle 96. With this arrangement, there is almost no throttling affect as the main valve 70 opens or closes. On the contrary, opening of the main valve 70 is accomplished by a quick snap action, and closing of the main valve 70 is accomplished by a quick snap action that positively engages the ball stopper 72 against the nozzle 96. This quick, snap full opening and full closing action of the main valve 70 contributes to efficient and dependable operation over long periods of time with little or no wear or cutting in the ball stopper 72 or seat of nozzle 96. Consequently, failure of the main valve is virtually eliminated.

A cylindrical filter 106 is positioned in the filter housing 100 across the inlet to supply duct 110 to prevent solids and particulate matter from entering the duct 110 where it could interfere with the close tolerances in nozzle 64, bore 44, or in the operation of the main valve 79. O-ring seals 108, 116 keep impurities from flowing around the filter, and the filter is held in place by a retainer plug 112 positioned in bore 118 in valve housing 28. The retainer plug 112 is fastened to the valve housing 28 by screws 115.

A tube 120 extends from the bottom of reservoir 12 to the solenoid housing 30 to facilitate running electric wires 122 from the electronic generator and control assembly 150 above the reservoir to the solenoid 32. The wires 122 extend into the interior 38 of solenoid housing 30. An elongated tube 132 extends from wire duct 120 and valve housing 28 upwardly through the reservoir 12. This tube 132 facilitates running the solenoid circuit wires 122 through the reservoir to the electronic generator and control assembly 150. The tube 132 also houses the level control switches 140, 145 and provides a guide for the float 134, as will be described in more detail below.

Figure 5:
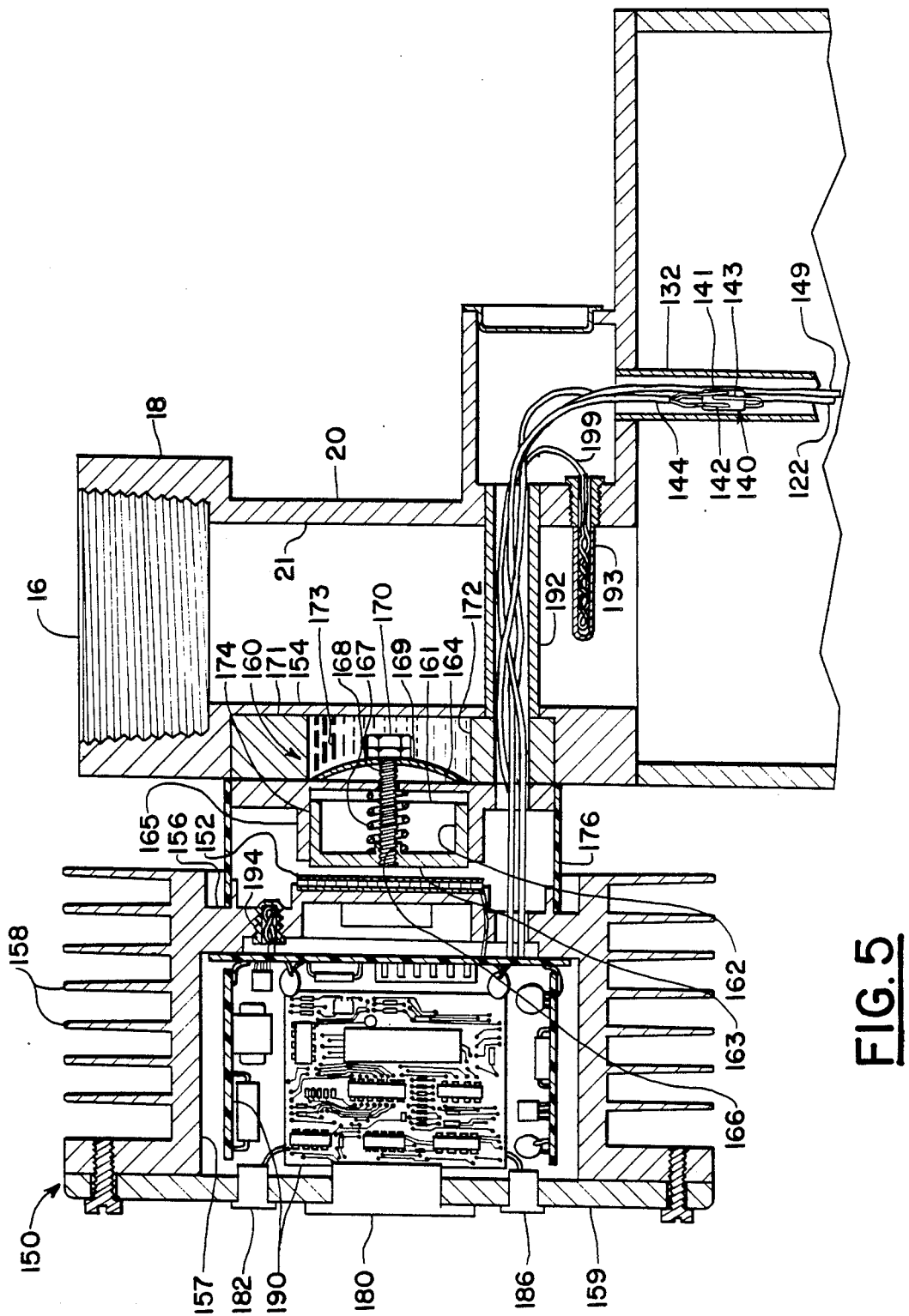
FIG. 5 is a cross-sectional view of the top of the reservoir and the thermal-electric generator and temperature control apparatus taken along lines 4—4 of FIG. 2.

Referring now primarily to FIG. 5, electric power for operating the solenoid 32 is produced thermionically by the thermal-electric generator 52 positioned in the heat sink housing 156. An appropriate thermal-electric generator 152 can be a thermopile comprised of a plurality of thermal-couples connected together in series, or, in the preferred form, by a crystalline semi-conductor structure known as a thermal electric module, such as part no. 801-2004, manufactured by the Cambion division of Midland Ross Corporation, which produces an electric current when there is a differential temperature between its opposing faces. Consequently, the thermal-electric generator 152 is positioned in the electronic generator and control assembly 150 with one side against the heat sink body 156 and the other side facing the heat source.

The heat source in this embodiment is the steam and condensate in the inlet tube 20. Heat is drawn from the intake tube 20 and conducted to the right side of thermal-electric generator 152. The heat sink body 156 on the opposite side of the thermal-electric generator 152 conducts heat away from the thermal-electric generator 152 and dissipates it through fins 158 into the atmosphere. In this manner, a temperature differential is maintained between the opposite sides of the thermal-electric generator 152, as required for it to generate electric power thermionically.

Excessive heat and high temperature can destroy the structure of thermal-electric generator 152, such as by melting soldered contacts, destroying crystalline structures, and the like. In practice, an upper safe operating temperature limit for the thermal-electric generators utilized in this invention is approximately 200 degrees Fahrenheit. Since it is not unusual for the temperature of steam in steam distribution systems to reach up to 600 degrees Fahrenheit, it is necessary to protect the thermal-electric generator 152 from unacceptably high temperatures that could exist in the intake tube 20. Therefore, a heat control assembly 160 is positioned between the thermal-electric generator 152 and the intake tube 20.

This heat control assembly 160 is comprised of a cup 161 fabricated of good thermal conducting material slideably positioned in a sleeve 165 formed in a mounting plate 164. The cup 161 is positioned in the sleeve 165 with its base or end 161 positioned so that is can slide into contact with the thermal-electric generator 152. A threaded bolt 167 screwed into a threaded bore 166 in the cup base 163 mounts the cup 161 in the sleeve 165. The bolt 167 extends through the front face of mounting plate 164, and a bi-metallic spring 169 is mounted on the bolt 167 and retained thereon with nuts 170.

An annular spacer ring 171 is positioned between the mounting plate 164 and the wall 154 of intake tube 20 and around the bi-metallic spring 169 in such a manner as to form a cavity 172 between the bi-metallic spring 169 and the intake tube wall 154. This cavity is filled with a viscous fluid, such as a thermal compound or thermal conducting grease 173. Some of the thermal conducting grease is also spread around the periphery of the cylindrical sidewalls 162 of the cup 161 between the sidewalls 162 and sleeve 165 to facilitate thermal conduction as well as easy sliding movement.

When the apparatus is cold, the bi-metallic spring 169 collapses and allows the base 163 of cup 161 to be positioned in contact with the face of thermal-electric generator 152. Then, as condensate and steam are introduced into the inlet tube 20, the heat is conducted through the sidewall or heat transfer surface 154 of the inlet tube 20. From the heated sidewall 154, the heat is conducted through the spacer ring 171, mounting plate 164, and cup 161 to the surface of the thermal-electric generator 152. Also, heat is conducted through the sidewall 154 and thermal compound 173 to the bi-metallic spring 169. As the bi-metallic spring 169 heats up, it buckles and pulls the cup 161 away from the surface of the thermal-electric generator 152. As the cup 161 is pulled away from the thermal-electric generator 152, heat can no longer be conducted directly from the base 163 of the cup to the thermal-electric generator 152. The air between the cup 161 and thermal-electric generator 162 serves as a partial insulator and keeps the temperature of the thermal-electric generator 152 from rising as high as the temperature of the fluid in inlet tube 20.

However, in order to be sure that sufficient heat is transferred to the thermal-electric generator 152 to produce the required voltage, a coil bias spring 168 is placed around the bolt 167 between the base 163 of cup 161 and the front face of mounting place 164. This coil spring 168 biases the cup 161 toward the thermal-electric generator 152 and is selected to have sufficient strength to maintain the base 163 in contact with the surface of the thermal-electric generator 152 against the bias of the bi-metallic spring 169 until the maximum safe operating temperature, e.g., approximately 200 degrees Fahrenheit, is reached. At that point, the bias of the bi-metallic spring 169 overcomes the bias of the coil spring 168 and begins to pull the cup 161 away from the thermal-electric generator 152. In this manner, sufficient heat is maintained on the thermal-electric generator 152 for production of sufficient electric power to operate the system, yet the temperature is not allowed to get so high as to damage the structure of the thermal-electric generator 152.

A cavity 157 in the end of the heat sink body 156 provides a convenient location for mounting the electronic circuit boards 190. An end plate 159 has mounted thereon appropriate displays for maintenance data, as also shown in FIG. 2. Such displays include a totalizer or counter 180 for registering the volume of condensate eliminated from the steam distribution system. An alarm 182 indicates a malfunction, such as a main valve stuck in the open position allowing live steam to escape from the steam distribution system. Display 184 indicates when the apparatus is in the fill mode and condensate is being collected in the reservoir 12. Display 186 indicates when the apparatus is in the air purge mode allowing steam and air to blow through the reservoir and out the outlet. The display 188 indicates when the apparatus is in the dump mode to dump the condensate W from the reservoir 12.

The heat sink body 156 is physically mounted on the mounting plate 164, but it is kept thermally isolated therefrom by a cylindrical non-heat conducting spacer 176. A conduit 192 extends from the electronic generator and control assembly 150 through the interior 21 of the inlet tube 20 for accommodating the electronic circuit wires 122, 144, 149, and 191. A first temperature sensor 193, preferably a thermistor, is positioned through the sidewall of intake tube 20 for sensing the temperature of the fluids in the inlet tube 20. A second temperature sensor 194 is positioned in the heat sink body 156 for sensing the temperature of the heat sink body 156. These temperature sensors are utilized for monitoring the air content of the steam and controlling air purge functions, as will be described in more detail below.

The structure of the condensate level switch assembly 130 is best described by reference to FIGS. 1, 3, 4, and 5. As mentioned above, the elongated tube 132 extends from the bottom of the reservoir 12 to the top thereof. In addition to accommodating the solenoid circuit wire 122 positioned therein, an upper magnetic reed switch 140 is positioned inside the tube 132 near the top of the reservoir 12, and a similar electronic reed switch 145 is positioned in the tube 132 near the bottom of the reservoir 12. The upper reed switch 140 has two permanent contacts, 141, 142, positioned in space-apart relation therein. A moveable reed contact 143 is positioned in a normally closed position with contact 141 and in a normally open position with contact 142. Likewise, the lower reed switch 145 also includes two permanent contacts 146, 147 therein. A moveable contact 148 is normally closed with contact 146 and is normally opened with contact 147. These moveable reed contacts 143, 148 are responsive to a magnetic force. Therefore, if a magnet is positioned adjacent upper reed switch 40 on the side of contact 142, the moveable contact reed 143 will be drawn away from contact 141 to open that circuit and will close with contact 142. Likewise, if a magnet is placed adjacent the lower reed switch 145 on the side of contact 147, the moveable reed contact 148 will be drawn away from contact 146 to open that circuit and will close with contact 147. As soon as the magnet is removed, the reeds 143, 148 will return to their normally closed positions against contacts 141, 146, respectively.

Such a magnet 136 capable of shifting the reeds 143, 148 in switches 140, 145 is positioned in the interior of a hollow aluminum float 134. The float 134, of course, is buoyant and floats on the surface of the condensate W in the reservoir 12. The float 134 is in the shape of a ring and is positioned around tube 132 so that tube 132 acts as a guide for the float 134 as it moves up and down in the reservoir 12. Therefore, when the reservoir is full of condensate W, as shown in FIG. 1, the float 134 rises to a position adjacent the upper reed switch 140 and the magnet 136 draws the reed 143 away from contact 141 and closes it with contact 142. This switch initiates the dump mode wherein the solenoid 32 is de-energized allowing the armature 50 to seat against the nozzle 64 so that the main valve 70 is opened, as shown in FIG. 3. In this mode, the condensate is dumped from the reservoir 12 through outlet tube 26 and nozzle 96 and allowed to flow out the outlet 22.

As the level of the condensate W starts to descend in the reservoir 12 during the dump, the float 134 moves downwardly away from the upper reed switch 140. As soon as the float 134 and magnet 136 move away from the upper reed switch 140, the reed 143 will return to its normally closed position against contact 141. This condition is maintained until the condensate level drops to the low level near the bottom of the reservoir 12, as shown in FIG. 4. At this low level, the float 134 and magnet 136 are positioned adjacent the lower reed switch 145, causing the reed 148 to move away from contact 146 and to close with contact 147. This condition causes the solenoid 32 to be energized again, thereby opening the nozzle 64 and applying pressure in the diaphragm chamber 87 to close the main valve 70, as shown in FIG. 4. With the main valve 70 closed, the condensate level in the reservoir 12 begins to rise again, moving the float 134 and magnet 136 away from the lower reed switch 145. When this occurs, the reed 148 returns to its normally closed position against contact 146.

The air purge mode overrides the condensate dump mode. The initiation and termination of the air purge mode, wherein the main valve 70 is opened to allow condensate, steam, and air to blow through the reservoir 12 and out of the outlet 22 until the amount of air in the steam distribution system is reduced to an acceptable level, is best described by reference to FIG. 6. The amount of air entrained in the steam distribution system is monitored and determined by monitoring and comparing voltage measurements that correspond to heat transfer and to temperature differentials. The system of this invention is capable of monitoring the air content in the steam and always maintaining it within set limits, regardless of the saturated steam temperature and pressure.

The presence of air and other non-condensables in the steam system reduces the actual temperature of the steam, so it is incapable of carrying as much heat to the point of use. More significant, however, is the fact that air in the steam system creates a film on the heat transfer surfaces between the steam and the walls of pipes and heat exchangers through which the heat must flow. This film acts like an insulator that inhibits heat transfer from the steam through the walls of the heat exchanger, and this heat transfer inhibition varies in direct proportion to the amount of air and other non-condensables in the steam system.

A film coefficient H can be defined to describe the extent of the heat transfer inhibition of the film, as follows:

$$H = K \frac{Q}{T_s - T_x}$$

where K is a constant, Q is heat flow, Ts is the temperature of the steam, and Tx is the temperature of the heat sink or heat exchanger. Small concentrations of air can dramatically reduce the film coefficient H, thereby significantly inhibiting heat transfer. For example, a 1% concentration of air can, in some instances, cause a 50% reduction in the film coefficient H. Accordingly, the thermal efficiency E* is directly proportional to the film coefficient H.

$$E^* \alpha H$$

Thus, thermal efficiency E* increases as the film coefficient H increases, and thermal efficiency E* decreases as the film coefficient H decreases. Consequently, removal of air and non-condensables is mandatory in order to operate a steam system efficiently. The object, therefore, is to determine when the thermal efficiency E* gets unacceptably low, i.e., the air content gets unacceptably high, so that the air purge mode must be started. Then, as air is purged from the system and the thermal efficiency E* rises to an acceptable level, the air purge mode must be stopped.

This unique method and apparatus utilizes two voltage measurements to monitor the thermal efficiency E*, thus air content of the steam. The first voltage E is the voltage produced by the thermal-electric generator 152, which is directly proportional to the heat flow Q from the inlet 20 to the heat sink 156.

$$E \alpha Q$$

The second voltage $E_t$ is a voltage that is proportional to the difference between the temperature of the steam $T_s$ and the temperature of the heat sink 156 adjacent the thermal-electric generator 152. Therefore, $$E_t \alpha (T_s - T_x).$$

Heat sensors 193, 194 are used to provide voltage outputs proportional to $T_s$ and $T_x$, respectively. Heat sensor 193 is positioned in the steam inlet 20 where it can sense the temperature of the steam in the system. Heat sensor 194 is positioned in the heat sink 194 adjacent the thermal-electric generator 152 where it can sense the temperature on the opposite side of the thermal-electric generator 152 from the heat source in the steam inlet 20. It should be noted in this regard that state of the art temperature sensors are available that output voltage in proportion to temperature. Thermistors, for example, are temperature-sensitive devices that have resistances which vary with temperature. They usually have high temperature coefficients of resistance that can be either positive or negative. If thermistors having a negative temperature coefficient of resistance are used for heat sensors 193, 194 in this invention, then voltage output will increase with temperature increase, and direct voltage outputs can be used to obtain a value for $E_t$, as follows:

$$E_t = E_s - E_x,$$

where $E_s$ is the voltage output of thermistor 193, and $E_x$ is the voltage output of thermistor 194.

Therefore, by utilizing the film coefficient H relationship with the heat flow Q and temperature difference $(T_s - T_x)$ defined above, i.e., $$H = K \frac{Q}{T_s - T_x}$$

a measurable thermal efficiency $E^*$ can be determined by the equation:

$$E = K' \frac{E}{E_t}$$

where K' is another constant that is proportional to K corresponding to the proportions between $E_t$ and E and between Q and $(T_s - T_x)$.

In other words, when thermal-electric generator 152 voltage E is high for a given temperature difference $T_s - T_x$, indicated by voltage $E_t$ from thermistors 193, 194, then there is little insulating effect of a film to inhibit heat flow Q. Thus, the air content of the steam is low. However, when the thermal-electric generator voltage E drops while the temperature difference $T_s - T_x$, indicated by voltage $E_t$ thermistors 193, 194, remains the same, then the insulating effect of the film has become more inhibiting to heat flow Q. Thus, the air content of the steam has increased. Of course, changes in the temperature differences $T_s - T_x$, measured by voltage $E_t$ from the thermistor 193, 194, in relation to heat flow Q, measured by thermal-electric generator voltage E, also indicates changes in air content according to the thermal efficiency $E^*$ equation defined above.

Figure 6:
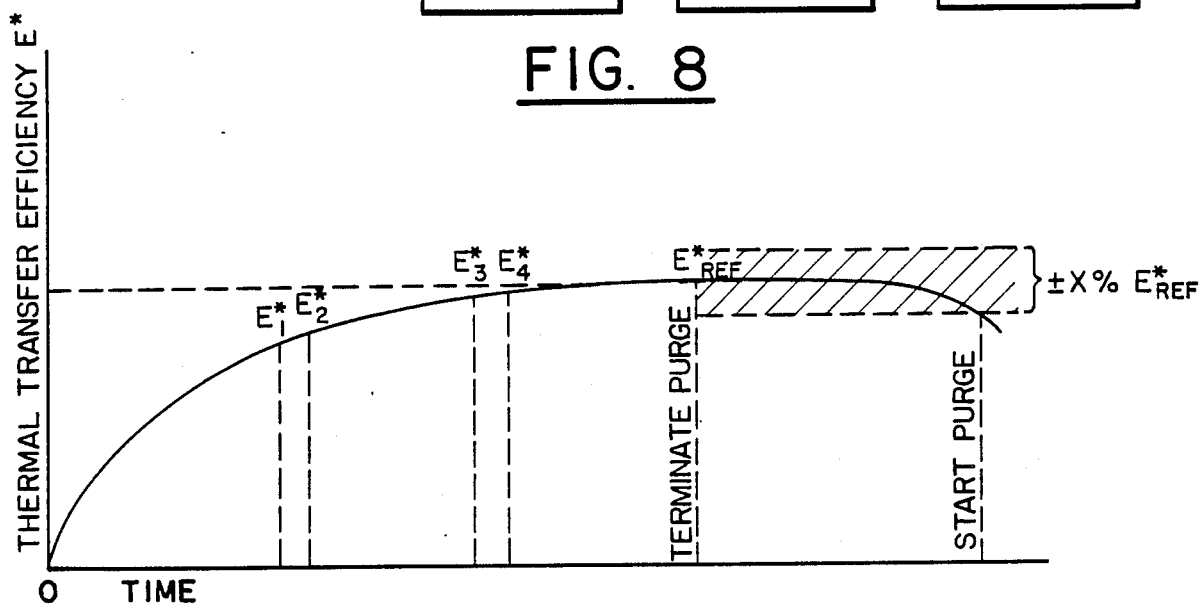
FIG. 6 is a graphic representation of the algorithm used in this invention for monitoring and purging entrained air in the steam distribution system.

During the initial phases of the air purge, when large quantities of air are being exhausted from the steam system, the rate of thermal efficiency $E^*$ rise is fairly rapid, as shown in FIG. 6. However, as the amount of air in the system is decreased through the purge, the rate of thermal efficiency $E^*$ rise decreases. For example, the rate of thermal efficiency $E^*$ rise between $E^*_1$ and $E^*_2$, as illustrated in FIG. 6, is greater than the rate of thermal efficiency $E^*$ rise between $E^*_3$ and $E^*_4$. Therefore, the thermal efficiency $E^*$ of the system is constantly monitored during the purge by measuring the thermal-electric generator 152 voltage E and the voltage difference $E_t$ between the thermistors 193, 194. A microprocessor 198 continuously calculates thermal efficiency $E^*$ from E and $E_t$ while it also continuously calculates the rate of thermal efficiency $E^*$ rise. When the rate of thermal efficiency $E^*$ rise decreases to a predetermined standard acceptable rate corresponding with an acceptable amount of air in the steam system, then microprocessor outputs a signal to terminate the purge. In order to stabilize this process, the microprocessor 198 can also be programmed to stop the purge only after the rate of change of $E^*$ has been stabilized at or below the predetermined standard acceptable rate for some minimum period of time, such as two minutes.

At the time the purge is terminated, the actual thermal efficiency $E^*$ at that time is made a reference thermal efficiency $E^*_{REF}$ and is retained in the microprocessor memory. Then, the microprocessor continues to moniter the thermal efficiency $E^*$ from E and $E_t$ during the normal operation through dump and fill modes. When the thermal efficiency $E^*$ varies more than a predetermined standard percentage of $E^*_{REF}$ corresponding to an unacceptable increase in the amount of air in the system or due to increases or decreases in steam system temperatures or pressures, the microprocessor will output a signal that will again start the air purge. For example, in the graph shown in FIG. 6, there is a band of acceptable $E^*$ variation from $E^*_{REF}$ with $E^*_{MAX}$ at the top of the band and $E^*_{MIN}$ at the bottom of the band. Where X% represents the predetermined standard acceptable percentage variation of the band:

$$E^*_{MAX} = E^*_{REF}(1 + X\%)$$

$$E^*_{MIN} = E^*_{REF}(1 - X\%)$$

When the actual thermal efficiency $E^*$ falls X% below or rises X% above the reference thermal efficiency $E^*_{REF}$, the purge is started to again eliminate air from the system and to reset a new $E^*_{REF}$. In practice, an $E^*$ variation band in the range of 2 to 3 percent is acceptable.

It should be noted that a pressure increase in the steam system will also increase the film coefficient H and thermal efficiency $E^*$. A significant pressure drop will lower the film coefficient H and thermal efficiency $E^*$. Therefore, a sufficient pressure increase or pressure drop will also start the purge mode, even if there is no excessive air content in the steam system. Of course an increase or decrease in steam system temperature will also change $E^*$ and could initiate a purge. However, the purges due to pressure or temperature changes in the steam system will last only long enough to stabilize the $E^*$ calculations and establish a new $E^*_{REF}$ adapted to the conditions of the new operating pressure. Then, the purge will be terminated, and the $E^*$ monitoring will proceed as before. It should also be noted that operation of the heat control assembly 160 also has the same effect on $E^*$ as an air film, i.e., an insulating effect, which could result in initiation of a purge. However, like purges induced by steam system pressure and temperature changes, a purge resulting from operation of the heat control assembly 160 will only last long enough to stabilize the $E^*$ calculations and establish a new $E^*_{REF}$ adapted to the new conditions.

Figure 7:
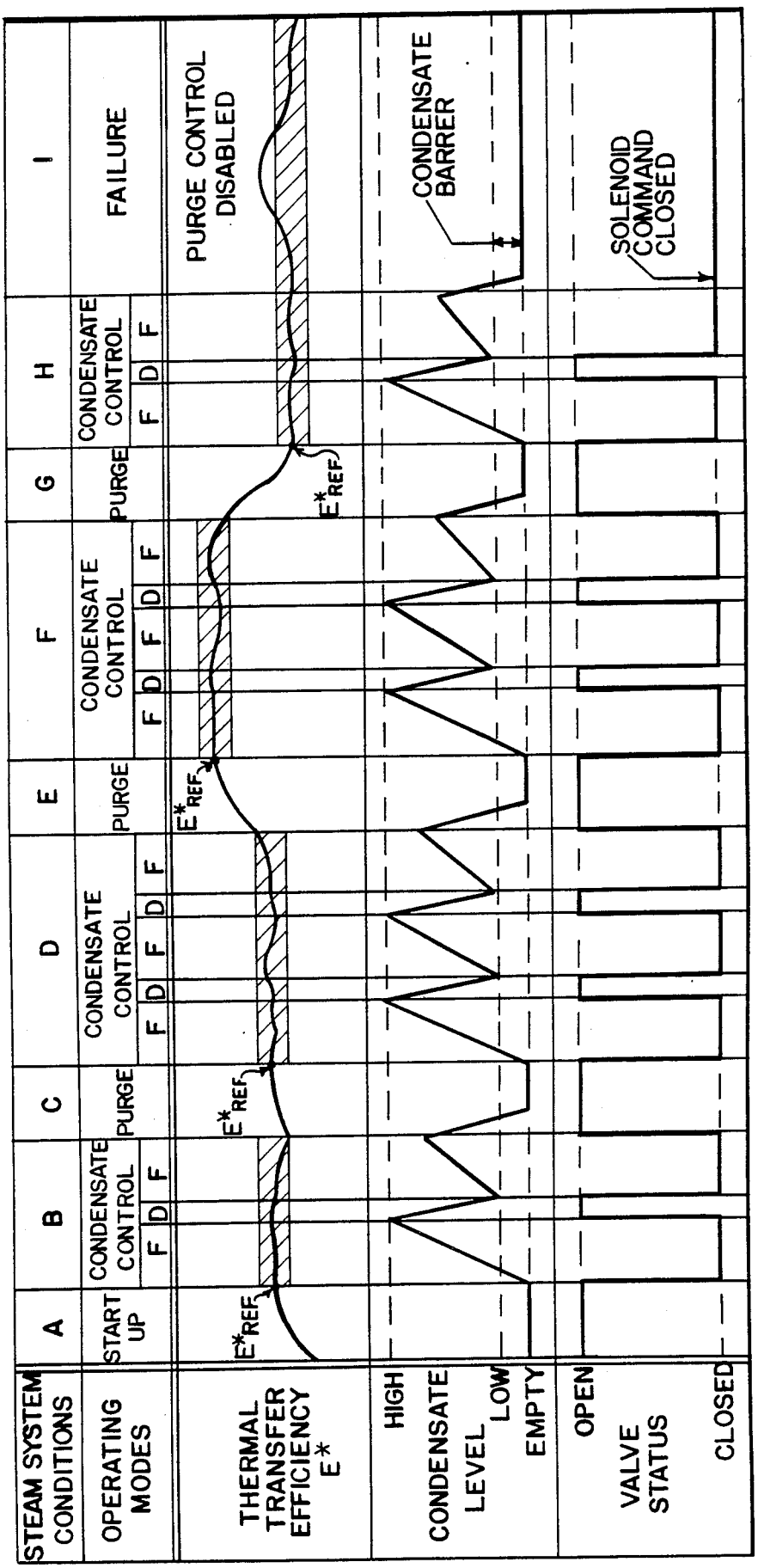
FIG. 7 is a table illustrating typical operating modes of the present invention under typical steam system conditions.

FIG. 7 illustrates some typical operating modes of the present invention under typical variations in a steam system. In the start up mode in condition A, steam condensing on the interior surface 21 of inlet 20 results in a rapid rise in thermal efficiency $E^*$. During this start up mode, the condensate W level in the reservoir 12 is empty, and the main valve 70 is open. As the E* stabilizes, which is determined by a decrease in the rate of E* rise, a new E*$_{REF}$ is set, and the main valve 70 is snapped closed. At this point, the normal condensate control modes of condition B are started.

In the fill mode F of condition B, the main valve 70 is closed, so the condensate W level rises in the reservoir 12. The thermal efficiency E* remains relatively stable during this condition B as long as the air content in the steam remains low. When the reservoir 12 is full, i.e., high level, the dump mode D is started by opening main valve 70, which remains open while the condensate W is drained. When the low level point is reached in the reservoir 12, the main valve 70 is closed again to end the dump mode D, and another fill mode F begins.

If, during this fill mode F, the air content in the steam increases enough to lower the thermal efficiency E* below the permissible percentage variation band, an air purge mode will be initiated as shown in condition C. This air purge mode is started by opening main valve 70, even if the reservoir 12 is not yet full of condensate W. Whatever condensate W that is in the reservoir 12 is immediately drained until the reservoir 12 is empty. The main valve 70 remains open after the reservoir 12 is empty allowing live steam, air, and other non-condensables to blow through the reservoir 12 and out of the steam system. This purge mode continues until elimination of air and other non-condensables from the steam system causes the thermal efficiency E* to rise again and stabilize. When E* is stabilized, the main valve 70 is closed to end the purge mode and start another fill mode F, as shown in condition D. As the main valve 70 is closed, the E* existing at that point is stored as the new E*$_{REF}$ for defining the new acceptable variation band E*$_{MAX}$ E*E*$_{MIN}$.

In condition D, several fill and dump modes are illustrated with the thermal efficiency E* remaining within the acceptable E*$_{MAX}$ > E* > E*$_{MIN}$ band.

At the end of condition D during a fill mode, there is an illustration of a pressure increase in the steam system causing an increase in E* above the acceptable band. This increase in E* above the acceptable band does not indicate an unacceptable air content or insulating film. In fact, it indicates a more efficient operation. However, in order to continue accurate monitoring of the air content, a new E*$_{REF}$ must be set at the new stabilized higher pressure of the steam system. Therefore, this pressure increase does cause another purge mode, as indicated in condition E, by opening main valve 70. Any condensate that is in the reservoir 12 is drained, and live steam is allowed to blow through the reservoir 12 for a relatively short time until E* stabilizes at the new level corresponding to the new higher pressure condition in the steam system. At this point, the main valve 70 is closed ending the purge mode and starting a new fill mode F, and a new E*$_{REF}$ is set at the new stabilized E* value.

This new high pressure mode of operation is shown in condition F, where several normal fill and dump modes are illustrated with a fairly stable E* remaining within the new acceptable E*$_{MAX}$ > E* > E*$_{MIN}$ BAND. Then during a fill mode F near the end of high pressure condition F, there is an illustration of the steam system pressure dropping significantly. This pressure drop causes E* to decrease below E*$_{MIN}$ of the acceptable band, thus triggering another purge mode as illustrated in condition G. The main valve 70 is open, any condensate W that is in the reservoir is drained, and live steam is allowed to blow through the reservoir 12 for a short time until a new stable E* is reached corresponding to the new low pressure condition of the steam system. At this point, the main valve 70 is closed to end the purge mode and to start a new fill mode F, and a new E*$_{REF}$ is set for this new low pressure operating condition illustrated as condition H.

Several normal fill F and dump D modes are also illustrated in this low pressure condition H. Then a failure mode is illustrated in condition I, where the control circuit and solenoid 32 should have the main valve 70 closed. However, the reservoir 12 remains empty with no condensate W barrier below the low level, which would occur when there is a failure in the main valve 70. If the main valve 70 was closed as it should be, the reservoir 12 would be filling with condensate W. Since there is no condensate W in the reservoir, the implication is that the main valve is stuck open or ball stopper 72 and seat 76 has failed allowing live steam to blow uncontrolled through the reservoir 12. If this condition remains for a period longer than a pre-set arbitrary acceptable time, such as 30 minutes, this condition triggers the alarm 182 to notify maintenance personnel that there is a malfunction that could be wasting energy and should be checked and repaired if necessary.

It is appropriate to note that the above-described method does not require absolute temperature or voltage measurements, since it functions on relative values and proportions. The standard and threshhold values described above are therefore calibrated to the relative values and proportions that are output by the components used. The method, as described above, assumes the use of thermistors 193, 194 that not only have negative temperature coefficients of resistivity, but also that they are linear. If thermistors having non-linear temperature coefficients of resistivity and/or positive temperature coefficients of resistivity are used, so that voltage outputs E$_s$ and E$_x$ do not vary in direct proportion to temperature, appropriate adjustments or compensations have to be made by the microprocessor program to put the thermal transfer efficiency E* values in a useful form for accurate monitoring of air in the steam system. Such adjustments or compensations would preferably include calibrations and conversions of the voltage output values to actual temperature values or other values directly proportional to actual temperature values. In the alternative, the standard and threshhold values could be determined to correspond to the non-linear outputs. In the case of thermistors having positive temperature coefficients of resistivity, the output values can be inverted by the microprocessor before calculating and comparing the thermal transfer efficiency E*. Alternatively, the formula could be changed to reflect this inversion, as follows:

$$E^* = K'' \frac{E}{\frac{1}{(E_s - E_x)}},$$

so that $$E^* = K''E(E_t).$$

A simplification of the apparatus can be made by assuming the temperature $T_s$ of the steam remains constant, which is a legitimate assumption for most steam systems. With this assumption, the only variables remaining in the equation $$E^* = K' \frac{E}{E_s - E_x}$$

are the voltage output E from the thermal-electric generator 152 and the voltage output $E_x$ from the heat sensor 194 in the heat sink 156. Therefore, accurate results can also be obtained by eliminating the heat sensor 193 in the inlet 20 and programming the microprocessor 198 to determine an E* value with input only from the thermal-electric generator 152 and heat sensor 194. When this alternative is used, a thermistor 194 having a positive temperature coefficient of resistivity is particularly appropriate. The characteristic of decreasing voltage output as temperature increases, and visa versa, allows a thermal transfer efficiency E* value to be obtained directly by dividing the voltage output E of the thermal electric generator 152 by the voltage output $E_x$ of the thermistor 194 without the necessity of inverting $E_x$. Thus, the thermal transfer efficiency E* value, under this alternative, can be determined as follows:

$$E^* = K' \frac{E}{E_x}.$$

It is also appropriate to mention that, while the above description is based on utilizing voltage output measurements from the thermal-electric generator 152 and heat sensors 193, 194, other electrical properties, such as current, can also be used for making the thermal transfer efficiency E* determinations.

Figure 8:
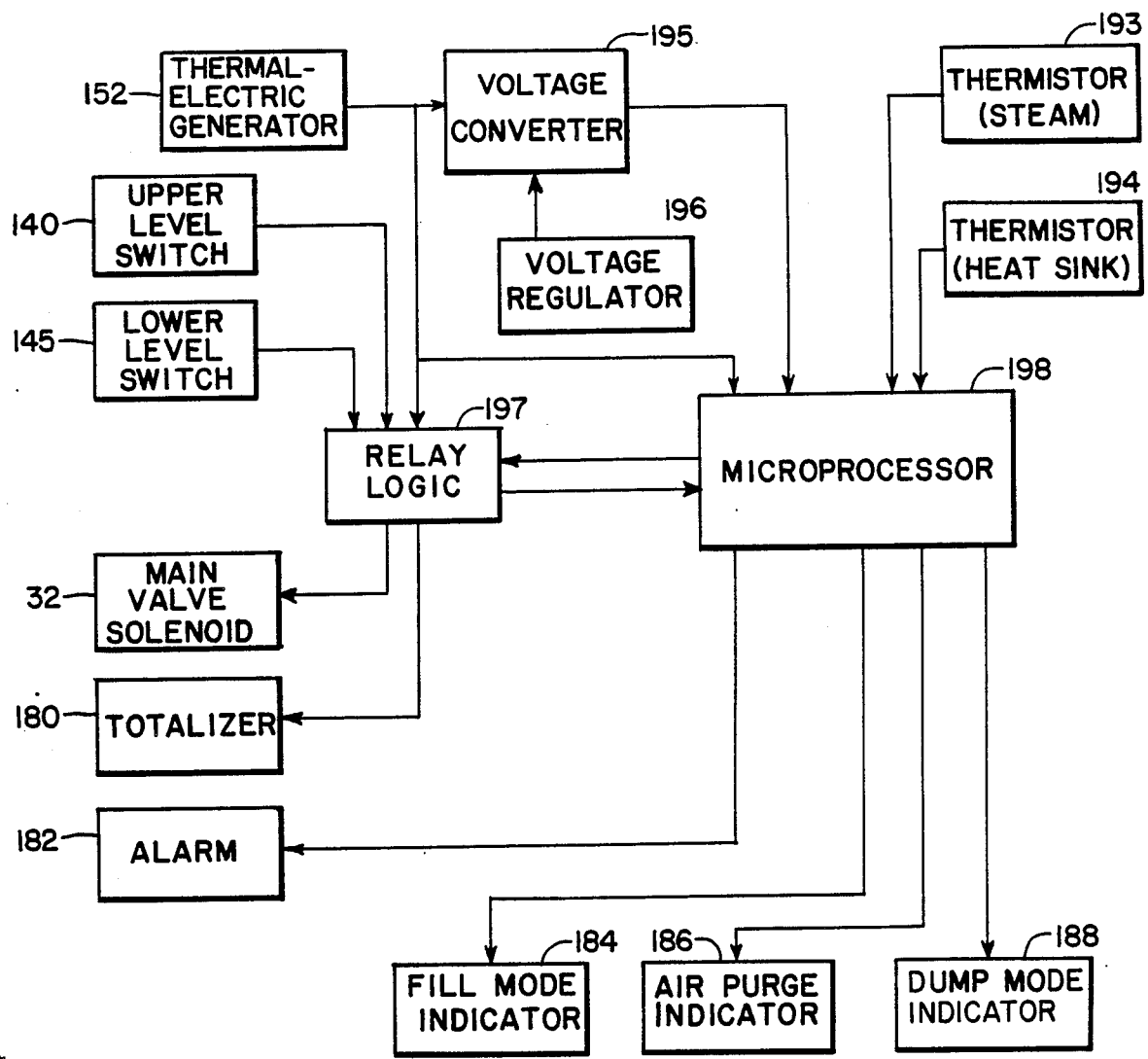
FIG. 8 is a logic diagram of the electronic control circuit of the present invention.

The electronic circuit and logic of this invention is shown in FIG. 8. The thermal-electric generator 152 generates electric power for operating the system. A relay logic 197 in the electric circuit energizes and de-energizes the main valve solenoid 32 to open and close the main valve 70. The upper level switch 140 is connected to the relay logic 197, and it causes the relay logic 197 to de-energize the main valve solenoid to start a dump when the level of the condensate in the reservoir reaches the position of the upper level switch 140. Likewise, when the level of the condensate in the reservoir drops to the position of the lower level switch 145, the lower level switch 145 is connected to the relay logic 197 and it causes the relay logic 197 to energize the main valve solenoid 32 to close the main valve 70 and stop the dump. The relay logic 197 also energizes and de-energizes the totalizer 180, which indicates the volume of condensate eliminated from the steam system during the dumps.

The microprocessor 198 is also connected to the relay logic 197 to output data to the relay logic and it inputs data from the relay logic. While the main valve solenoid 32 and totalizer 180 are designed to operate on minimal electric power of approximately one (1) volt, the microprocessor 198 requires approximately five (5) volts to operate. Therefore, in electronic voltage converter 195 is provided to convert a one volt output of the thermal-electric generator to the five volts necessary for operating the microprocessor. An electronic voltage regulator 196 maintains the output of the voltage converter 195 at a maximum of five volts.

The thermistor 193 constantly monitors the steam temperature and it inputs this data into the microprocessor 198. The other thermistor 194 constantly monitors the temperature of the heat sink body 156 and inputs this data into the microprocessor 198. As described above, the microprocessor 198 utilizes the voltage inputs from the thermal-electric generator 152 and thermistors 193, 194 to calculate the current thermal transfer efficiency E*. As also discussed above, a useable E* value can also be obtained by assuming a constant steam system temperature, eliminating the thermistor 193, and using only the outputs from the thermal-electric generator 152 and thermistor 194.

The microprocessor 198 then compares the actual thermal transfer efficiency E* to the reference thermal transfer efficiency $E^*_{REF}$, and when the variation exceeds a predetermined standard band of acceptable E* variation, the microprocessor 198 outputs a signal to the relay logic 197 to de-energize the main valve solenoid 32 to open the main valve 70 and initiate a purge. During the purge, the microprocessor 198 continues to monitor the voltage inputs from the thermal-electric generator 152 and thermistors 193, 194 and it continuously calculates the rate of thermal transfer efficiency E* rise in the system. When the rate of E* rise decreases to a pre-determined standard indicating a stabilized condition and a system purged of excess air, the microprocessor 198 outputs a signal to the relay logic 197 to energize the main valve solenoid 32 to close the main valve 70 and terminate the purge. The microprocessor 198 also receives input from the relay logic 197 to determine the time the main valve 70 is opened during the dump mode and compares it to a predetermined standard acceptable time. If the main valve 70 remains open longer than the predetermined standard acceptable times for dumps and purges, the microprocessor 198 outputs a signal to activate an alarm 182. For example, if the upper reed switch 140 remains actuated by the float magnet 136 for more than two minutes, or if lower reed switch 145 remains actuated by float magnet 136 for more than 30 minutes, the alarm would be actuated. Also, if it takes longer than a predetermined time, such as 30 minutes, for the reservoir to fill from the low level to the upper level, the alarm could be actuated. Still further, if E* has not stabilized during a purge within some predetermined time, such as 30 minutes, the alarm could be actuated. The microprocessor 198 also activates visual indicators 184, 186, 188 for the fill mode, air purge mode, and dump mode, respectively.

As briefly mentioned above, a totalizer 180 is provided to display the volume of condensate dumped by this apparatus 10 for steam system management purposes. Since some additional condensate enters the reservoir during dump modes, it is not considered by the inventors to be accurate enough for effective management to merely count the dumps and multiply the count by the volume $V_o$ of the reservoir 12 between the high and low levels. It is also very desireable, if not necessary, to include the volume $V_I$ of condensate W that flows into the reservoir 12 during the dumps. Therefore, the total volume V of a dump is equal to the volume $V_o$ of the reservoir 12 between the high and low levels plus the volume $V_I$ of the condensate W that flows into the reservoir 12 during the dump, as follows:

$$V = V_o + V_I$$

The method and apparatus of this system calculates the rate of inflow $R_I$ of condensate W into the reservoir during each fill, as follows:

$$R_I = \frac{V_o}{t_f}$$

where $V_o$ is the volume of the reservoir between the high and low levels and $t_f$ is the time required to fill the reservoir from the low level to the high level. Therefore, a current, updated inflow rate $R_I$ is available for every dump.

Assuming that the rate of inflow $R_I$ remains fairly constant from a fill to the next ensuring dump, the rate of inflow during the fill can be used as the rate of inflow during the next dump. Thus, the volume $V_I$ of condensate W that flows into the reservoir 12 during the dump can be calculated by multiplying the rate $R_I$ times the time $t_D$ of the dump as follows:

$$V_I = R_I t_D$$

Consequently, an accurate volume V for each dump can be obtained as follows:

$$V = V_o + R_I t_D.$$

Therefore, $$V = V_o + t_D \left( \frac{V_o}{t_f} \right)$$

and the total volume V of each dump, including inflow during the dump is $$V = V_o \left( 1 + \frac{t_d}{t_f} \right)$$

Since the volume $V_o$ is always the same as determined by the physical dimensions of the reservoir 12 and settings of the upper and lower reed switches 140, 145, and the times of the fills and dump $t_f$ and $t_D$ can be constantly monitored by the microprocessor 198, the total volume V of each dump can be calculated quite accurately. The microprocessor 198, therefore, constantly monitors and updates the times between respective actuations of the upper reed switch 140 and lower reed switch 145 during dumps and fills. Then, it utilizes these updated fill and dump times to calculate the total volume V of condensate discharge for each dump and outputs signals to the totalizer 180 to register the total volume of condensate discharged from the steam system in terms of gallons, cubic feet, or liters, as desired. The totalizer outputs of volume can also be grouped into larger terms, such as 10 gallons, to conserve available electric energy as necessary.

An electronic circuit capable of operating the apparatus of this invention as described above is shown in FIG. 9. The thermal-electric generator 152 produces approximately one volt of electric power, which is sufficient to operate the solenoid 32, the totalizer 180 and the thermistors 193, 194. The relay logic is comprised of a latching relay K1 and a normally closed relay K2. The upper and lower reed switches 140, 145 are shown in the respective normal conditions when the float 134 and magnet 136 are not adjacent either one of the switches, i.e., during a dump or during a fill between the upper level and low level positions. During the fill mode, the relay K1 is closed, and the circuit is completed through upper reed switch 140 and relay K1 to energize solenoid 32. When the solenoid 32 is energized, the main valve 70 is closed.

When the reservoir 12 is full of condensate W and the float 134 rises to a position adjacent the upper reed switch 140, the upper reed switch will switch to the alternate position, thereby energizing the upper coil of relay K1 to open the relay K1 and de-energize the solenoid 32. Energizing the solenoid 32 opens the main valve 70 and initiates the dump. As the float moves down away from the upper reed switch, the upper reed switch 140 will switch back to the normal position; however, the latching relay K1 remains open and keeps the solenoid 32 de-energized to continue the dump.

When the reservoir 12 is empty, the float 134 moves into a position adjacent the lower reed switch 145 and switches the condition thereof to energize the lower coil in relay K1, which latches the relay K1 closed and energizes the solenoid 32. When the solenoid 32 is energized, the main valve 70 closes and the apparatus goes into a fill mode. As the float moves upwardly away from the lower reed switch 145, the lower reed switch shifts back to its normal condition and de-energizes the lower coil of relay K1; however, the relay K1 remains latched in the closed position to continue energizing the solenoid 32 and maintaining the fill mode. Also, when the relay K1 is closed, power is applied to the totalizer 180 so that is is in condition to operate upon an output signal from the microprocessor to close transister Q6.

As mentioned above, the microprocessor 198 requires five volts to operate, therefore, a unique electronic voltage converter 195 is provided to increase the thermal-electric generator output voltage from one volt to five volts. The principle voltage converter components of this device are the single inductor L1, the transistor Q2, resistor R2 and recitifing diode D1. An oscillator is set up by capacitator C1 and resistor R1 to turn the transistor Q2 on and off.

Initially, the base of transistor Q2 is energized through resistor R1 and capacitor C1, which turns on transistor Q2. While transistor Q2 is turned on, the circuit through L1 is completed to ground, thereby inducing a magnetic field in inductor L1. After some period of time, capacitor C1 will become fully charged and current will effectively be stopped, which turns off transistor Q2. When transistor Q2 is turned off, the magnetic field in the inductor L1 collapses inducing a secondary charge which dumps through rectifier diode D1. At the same time, the base of transistor Q1 is energized through resistor R2 from a secondary charge induced by inductor L1. This charge on the base of transistor Q1 turns on transistor Q1 to shunt the resistor R1 and capaciter C1 to ground, thereby turning off the voltage to the base of transistor Q2. This condition lasts until the secondary induced charge from L1 is dissipated and transistor Q1 is turned off again.

As soon as transistor Q1 is turned off, the base of transistor Q2 is again charged through resistor R1 and capaciter C1 to turn on transistor Q2 and load the inductor L1 to start the cycle over again. The resistor R11 and diode D2 are utilized to bias the oscillator circuit in such a manner that the charging phase of the cycle in inductor L1 takes place over a longer period of time than the time it takes for the inductor L1 to dump its secondary induced charge through diode D1 and resistor R2. As a result, the one volt that charges inductor L1 over a longer period of time is dumped during a shorter period of time at a higher voltage through diode D1. The capacitor C2 functions as a filter to smooth out the output voltage and increase the recitification efficiency of diode D1. The capacitor C6 also functions to smooth out the oscillations in the low voltage side of the voltage converter 195.

The electronic regulator circuit 196 is provided to keep the output voltage from the voltage converter 195 at five volts. It does so by utilizing a resistor R7 and a Zener diode regulator DR1 to maintain a constant precision 1.23 volts on the base of transistor Q5. The transistors Q4 and Q5 are amplifier transistors rather than switches. The resistors R4 and R5 are sized to divide down the voltage in such a manner that when five volts is present, the divided voltage on the base of transistor Q4 is precisely the same 1.23 volts as provided by the Zener diode DR1 on the base of transistor Q5. Then, if the output voltage of the voltage converter 195 rises above the five volts, the voltage dividers, resistors R4 and R5, would no longer provide 1.23 volts on the basic transistor Q4. Rather, the voltage on the base of transistor Q4 would also rise, which turns on transistors Q4 harder and lowers the voltage on the base of transistor Q3. The decrease of voltage on the base of transistor Q3 turns transistor Q3 on, which applies the output line voltage from the voltage converter to the base of transistor Q1. This application of voltage on the base of transistor Q1 turns on transistor Q1, thus turning off transistor Q2. In this way, the regulator overrides the voltage converter 195 and keeps it from operating until the output voltage falls back to the five volt level. As soon as the voltage falls back to the five volt level, the voltage dividers, resistors R4 and R5, again provide a precise 1.23 volt bias on the base of transistor Q4 to match the bias on the base of transistor Q5, which turns off transistor Q3 and allows the voltage converter 195 to resume its normal function.

The preferred embodiment of this invention utilizes a computer processing unit, number MC 1468705G2P U1, manufactured by Motorola Corporation for processing the temperature input information and outputting the necessary signals for initiating and terminating air purge modes as described above and activating visual displays. The CPU chip is powered by connecting the five volt lead to pin VDD and connecting pins VPP and VSS to ground. Capacitor C5 is a filter that functions to isolate the CPU from electronic noise produced by the voltage regulator circuit 195. An oscillating circuit comprised of crystal oscillator XL1, resistor R10 and capacitors C3 and C4 are connected to pins OCS1 and OCS2. The reset pin R and the interrupt request pin IRQ are biased and held high by connection through resistors R12 and R13 respectively to the five volt line, as required by this CPU chip for its boot strap mode.

Since the thermistors RT1 and RT2, which are utilized to continuously monitor the temperatures in the input tube 20 and heat sink 156, as shown at 193, 194, as well as the thermal-electric generator 152, have analog outputs, an analog to digital converter (ADC) is used to convert the analog output of these thermistors RT1 and RT2 and thermal-electric generator 152 to digital data useable by the CPU chip. In this preferred embodiment, a National Semiconductor number 0832 ADC is used. The ADC takes voltage input from the thermal-electric generator 152 through resistor R8. It also takes voltage inputs from the thermistors RT1 and RT2. The ADC converts these analog inputs into digital data for comparison of their values and utilization in the thermal transfer efficiency E* calculations required for monitoring, initiating and terminating the air purge mode. If the temperature of the steam in inlet 20 is presumed to be fairly constant, as described above, only input from thermistor RT2 is used, and thermistor RT1 can be eliminated.

Figure 9:
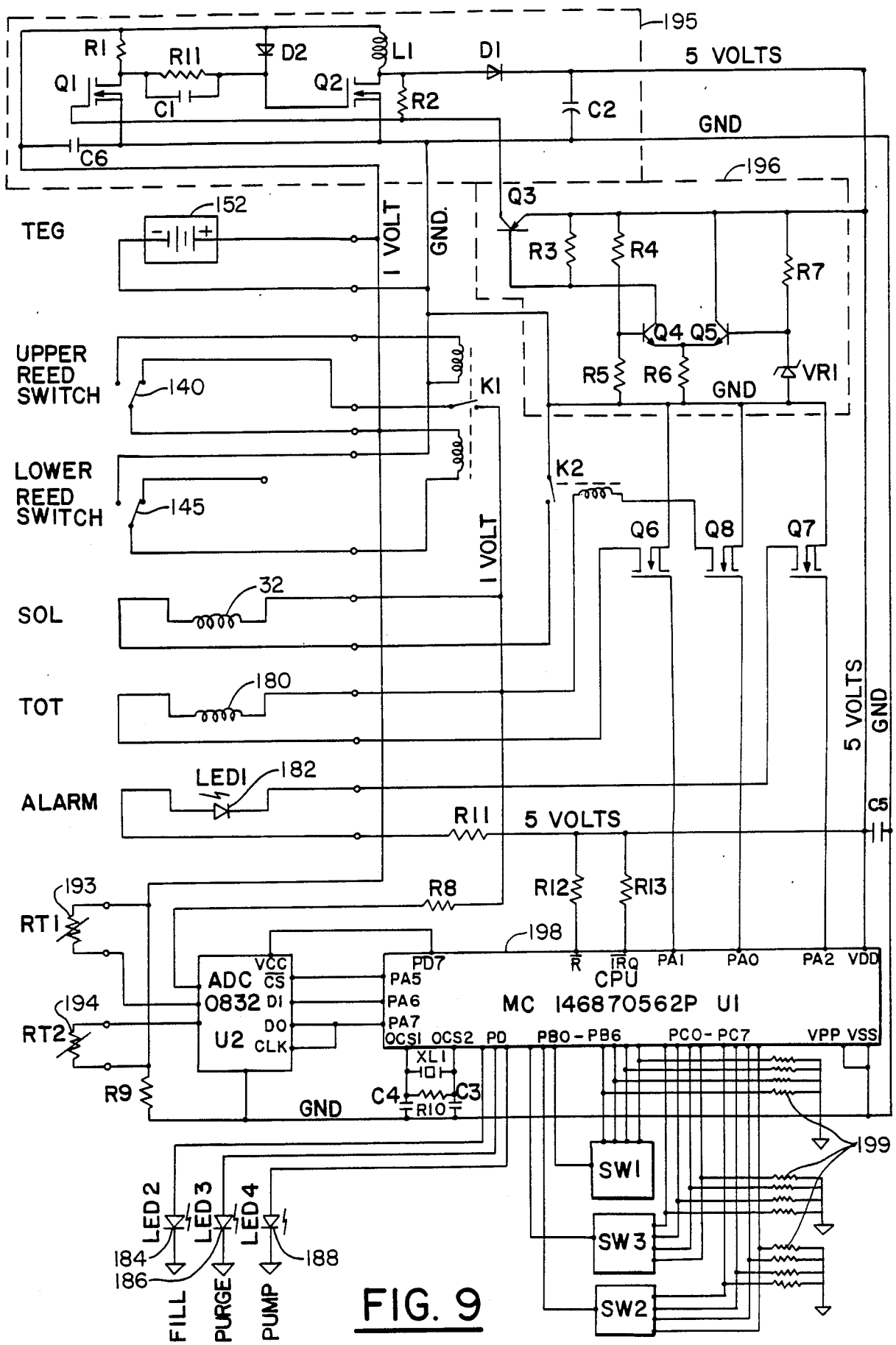
FIG. 9 is a schematic diagram of the electronic control circuit of the present invention.

As shown in FIG. 9, power is supplied to the ADC through pin PD7 of the CPU connected to pin VCC of the ADC. The logic required to drive the ADC is supplied through pins PA5, PA6, and PA7 connected to the chip select pin, data input pin, data output pin and clock pin of the analog to digital converter. Pins PA5, PA6, and PA7 are programmable input/output pins. Pins PA0, PA1, and PA2 are also programmable input/output pins utilized to increment the totalizer, drive the alarm indicator and to initiate the air purge mode.

As also shown in FIG. 9, output from pin PA1 is connected to the base of transistor Q6. Therefore, when a signal is put out on pin PA1, transistor Q6 is turned on to increment the totalizer 180. Such incrementing would correspond with volume calculations from condensate dump cycles as described above. Output of pin PA0 is utilized to initiate the air purge mode when excessive air is determined to be in the steam system as described above. Output on pin PA0 turns on transistor Q8, which actuates relay K2 to open the circuit to the solenoid 32 turning it off. When the solenoid 32 is turned off, the main valve 70 is opened and the purge is initiated. The purge continues as long as pin PA0 is high. When it is determined by the CPU that the rate of thermal transfer efficiency E* change has decreased to the predetermined standard as described above corresponding to an acceptable level of air in the steam system, pin PA0 will go low turning off transistor Q8 and actuating relay K2 to again complete the circuit to the solenoid 32 to close the main valve 70 and terminate the purge. Output from pin PA2 to transistor Q7 turns on transistor Q7 to power an alarm 182. The alarm can be an LED visual indicator, sound indicator, or it could even be a transmitter to transmit a signal to a receiver on a remote alarm.

The PD terminal pins of this CPU are also programmable input/output pins that are especially adapted for direct driving LED displays. These pins are utilized to drive the LED displays 184, 186, and 188 for indicating the fill, purge, and dump modes respectively. These LED's are preferably driven intermittently to conserve energy. For example, the LED's can be turned on for 3 milliseconds and off for 97 milliseconds.

The PB0 to PB6 pins and PC0 to PC7 pins are also programmable input/output pins that are utilized in this application to program the CPU in such a manner as to adapt it to calculate precisely and accurately with the particular volumes, pressures, and temperatures encountered with the apparatus. This programming is accomplished with the use of three hexi-decimal switches, SW1, SW2, and SW3 which provide sufficient variables to precisely calibrate the CPU to the characteristics of the apparatus and steam systems on which it is utilized for precise and accurate calculations and operations. These switches are connected to pull various combinations of these input/output pins to ground through resistors 199.

The types and values of the various electrical components shown in the electronic circuit in FIG. 9 are generally chosen for appropriate balancing and biasing as could be determined by a person of ordinary skill in the art, once the concept and theory of the invention is understood. However, for purposes of example, and not for limitation, some appropriate types and values are provided. In order to conserve energy, the transistors Q1, Q2, Q6, Q7, and Q8 are VMOS type transistors, which operate almost entirely on voltage with virtually no current draw. Resistor R1 is 4.7 kiloohms, R11 is 10 megaohms, and R2 is 10 kiloohms. Capacitor C1 is 0.01 microfarads, C2 and C6 are 47 microfarads, and C5, which filters noise from the voltage regulator 195 before reaching the microprocessor 198, is 0.1 microfarads. In the regulator circuit, R3 is 1 megaohm, R4 is 365 kiloohms, R5 is 121 kiloohms, R6 is 47 kiloohms, and R7 is 270 kiloohms. The Zener diode circuit VR1 is a National Semiconductor Company part no. LM385. The transistors Q3, Q4, and Q5 are common, conventional transistors, that need no special designation or value. In addition, R8 is 10 kiloohms, and R9 is 316 kiloohms. R10, R12, and R13 are each 10 kiloohms, and R11 is 47 kiloohms. The resistors 199 are each 1 megaohm.

Although the present invention has been described with a certain degree of particularity, it is understood that changes in structure and features of the invention may be made without departing from the coverage provided by this patent as defined in the appended claims.

We claim:

1. Steam system management apparatus, comprising:
   a reservoir having an inlet adapted for connection to a steam distribution system and an outlet;
   electronically actuated valve means for opening and closing said outlet;
   thermal electric generator means for converting heat energy in the steam system into electrical energy for operating said electronically actuated valve means; and
   temperature control means for limiting the temperature of the heat applied to said thermal electric generator means.

2. The steam system management apparatus of claim 1, wherein said pilot actuated valve means includes pressure actuated main valve means positioned in said outlet for selectively opening and closing said outlet, pressure distribution means for directing a fluid under pressure to said main valve means, and pilot valve means in said pressure distribution means for selectively applying and releasing pressure on said main valve means.

3. The steam system management apparatus of claim 2, wherein said main valve means includes an outlet nozzle in said outlet with a valve seat thereon, a moveable stopper element adapted to close said outlet nozzle by seating on said valve seat and opening said outlet nozzle by moving off said valve seat, piston means connected to said stopper for moving said stopper onto said valve seat in response to a pressure applied on said piston means.

4. The steam system management apparatus of claim 3, wherein said pressure distribution means includes a pressure fluid conduit connected to said outlet upstream from said outlet nozzle and opened onto said piston means, and wherein said piston means has an area larger than the cross-sectional area of said outlet nozzle at said valve seat.

5. The steam system management apparatus of claim 4, including filter means positioned in said outlet over the connection of said pressure fluid conduit for preventing solid matter from entering said pressure fluid conduit.

6. The steam system management apparatus of claim 5, wherein said filter means is positioned in said outlet in a manner to not inhibit and filter fluid flowing to said outlet nozzle.

7. The steam system management apparatus of claim 4, wherein said pressure distribution means includes pressure bleed means for bleeding pressure off said piston means.

8. The steam system management apparatus of claim 7, wherein said pressure bleed means includes bleed conduit connected to said pressure fluid conduit between said pilot valve means and said piston means and connected to said outlet downstream from said outlet nozzle.

9. The steam system management apparatus of claim 8, including bleed valve means in said bleed conduit for closing said bleed conduit when said pilot valve means is opened to apply pressure on said piston means and for opening said bleed conduit when said pilot valve means is closed to relieve pressure on said piston means.

10. The steam system management apparatus of claim 9, wherein said pressure distribution means and said pressure bleed means have a common valve chamber, and said pilot control means includes a common armature in said valve chamber with said pilot valve means positioned on and connected to one side of said armature and said bleed valve means positioned on and connected to the opposite side of said armature in such a manner that movement of said armature in one direction causes said bleed valve means to close while said pilot valve means opens simultaneously and movement of said armature in the opposite direction causes said pilot valve means to close while said bleed valve means opens simultaneously.

11. The steam system management apparatus of claim 10, wherein said pilot control means also includes an electric solenoid adjacent said armature for moving said armature in one direction upon application of an electric current to said solenoid and spring bias means connected to said armature for moving said armature in the opposite direction upon termination of the electric current in said solenoid.

12. The steam system management apparatus of claim 2, including a moveable armature connected to said pilot valve means, an electric solenoid adjacent said armature for moving said armature in one direction, and spring bias means connected to said armature for moving said armature in the opposite direction.

13. The steam system management apparatus of claim 2, wherein said air detection means includes thermal electric generator means for converting heat energy in the steam system into electric energy for operating said solenoid, and heat sensor means adjacent the side of said thermal-electric generator that is opposite said inlet and which is adapted to output an electric signal in relation to the temperature at the position of the heat sensor means, and computer means for constantly calculating a thermal transfer efficiency value by dividing the electrical output of the thermal-electric generator by electrical output of the heat sensor means and for calculating the actual rate of thermal transfer efficiency change during the air purge and comparing the actual rate of thermal transfer efficiency change to a predetermined standard rate of thermal transfer efficiency change corresponding with the predetermined minimum amount of air and outputting a signal to said solenoid actuator means to energize said solenoid to terminate the air purge when the actual rate of thermal transfer efficiency change equals and is less than the predetermined standard rate of thermal transfer efficiency change, and for constantly monitoring the actual thermal transfer efficiency of the steam system when air is not being purged and comparing the actual thermal transfer efficiency with a predetermined maximum acceptable percentage variation from the thermal transfer efficiency at the termination of the preceding air purge corresponding with the predetermined maximum acceptable amount of air in the steam system and outputting a signal to said solenoid actuator means to deenergize said solenoid to start an air purge when the actual thermal transfer efficiency of the steam system varies at least as much as the predetermined maximum acceptable percentage variation from the thermal transfer efficiency at the termination of the preceding air purge.

14. The steam system management apparatus of claim 13, wherein said temperature measuring means is a thermistor which produces a continuous analog electrical output corresponding to the temperature of the fluids in the steam system, and said computer means includes an analog to digital converter for converting the analog output of the termistor to digital data per predetermined time intervals and a digital computer processing unit operating system for performing the required algorithms, and the output of said computer means to said solenoid actuator means is digital.

15. The steam system management apparatus of claim 13, wherein said solenoid actuator means includes second relay means for opening the electrical circuit to deenergize said solenoid in response to said signal from said computer means to start an air purge and for closing the electrical circuit to energize said solenoid in response to said signal from said computer means to terminate an air purge.

16. The steam system management apparatus of claim 13, including low level alarm means for alerting attending personnel of excessively long periods of the main valve means being open.

17. The steam system management apparatus of claim 16, wherein said low level alarm means includes an output signal capable of being detected by a person's natural senses, an input signal to said computer means from said solenoid actuation means when said solenoid is deenergized, wherein said computer means is adapted to compare the time the solenoid is deenergized with a predetermined standard time corresponding to the normal time interval between deenergization of the solenoid when said reservoir is full of liquid and energization of the solenoid when said reservoir is empty of liquid and outputting a signal to said low level alarm means when the solenoid is deenergized for a time period longer than said predetermined standard time.

18. The steam system management apparatus of claim 4, wherein said piston means includes a pressure chamber, a rigid body positioned slidably in said pressure chamber, and a flexible membrane attached to said rigid body and extending radially outward therefrom into sealed contact around its entire peripheral surface with the interior walls of said pressure chamber.

19. The steam system management apparatus of claim 17, wherein said low level alarm means includes an electromagnetic signal transmitter, a receiver at a remote location, and an alarm signal generator at the remote location connected to the receiver.

20. The steam system management apparatus of claim 17, wherein said low level alarm means includes a visual display.

21. The steam system management apparatus of claim 1, including heat sink means in contact with said thermal electric generator means for drawing heat away from said thermal electric generator means.

22. The steam system management apparatus of claim 21, wherein said heat sink means includes heat dissipating means for dissipating and disposing of the heat energy drawn away from the thermal electric generator means.

23. The steam system management apparatus of claim 22, wherein said heat dissipating means includes a plurality of fins for dissipating heat energy into the atmosphere.

24. The steam system management apparatus of claim 1, wherein said thermal electric generator means includes means for converting heat energy directly to electrical energy.

25. The steam system management apparatus of claim 24, wherein said thermal electric generator means is a semiconductor device which generates an electric current and voltage when there is a temperature differential from one side to the other.

26. The steam system management apparatus of claim 1, wherein said thermal electric generator means is positioned adjacent said inlet.

27. The steam system management apparatus of claim 1, wherein said temperature control means includes a moveable heat conductor means positioned between the heat source and said thermal electric generator means, and heat sensitive moving means connected to said heat conductor means for moving said heat conductor means towards said thermal electric generator as the temperature decreases and for moving said heat conductor means away from said thermal electric generator means as the temperature increases.

28. The steam system management apparatus of claim 27, wherein said heat sensitive moving means includes a bimetalic spring connected to said heat conductor means for moving said heat conductor means away from said thermal electric generator means as the temperature increases and for moving said heat conductor means toward said thermal electric generator means as the temperature decreases.

29. The steam system management apparatus of claim 28, wherein said heat sensitive moving means includes bias means connected to said heat conductor means for biasing said heat conductor means toward said thermal electric generator means, the bias of said bias means being sufficiently strong to prevent said bimetalic spring from moving said heat conductor means away from said thermal electric generator means until the temperature rises to a predetermined magnitude.

30. The steam system management apparatus, comprising:
 a reservoir with an inlet and an outlet;
 valve means in said outlet for opening and closing said outlet, said valve means including an electric solenoid actuator;
 thermal electric generator means adjacent said inlet for producing electric power of about one volt of direct current potential thermionically from heat in the steam system for energizing said solenoid actuator; and
 electronic control means for controlling the electric power to actuate and deactuate said solenoid, said electronic control means including a voltage converter for converting the one volt electric power to about five volts of electric power, said voltage converter including an inductor coil, one end of which is connected to said one volt electric power and the other end of which is connected to ground, switch means between said other end of said inductor coil and the connection to ground, and a high voltage power output line with a rectifier diode therein connected to said other end of said coil between said other end of said coi and said switch means being timed to switch on a longer time to charge the inductor with the one volt power than it is switched off to discharge the coil through the high voltage output line.

31. The steam system management apparatus of claim 30, wherein said switch means includes a first transistor connecting said other end of said inductor to ground and an oscillator circuit connected to said one end of said inductor coil for turning said first transistor on and off, said oscillator circuit including a capacitor and a first resistor in parallel to each other connected between a second resistor and a diode in parallel to each other, said capacitor and the emitter of said diode being connected to the base of said first transistor, and a second transistor positioned to shunt said second resistor and said capacitor to ground, the base of said second transistor being connected to said high voltage output line.

32. The steam system management apparatus of claim 31, including a voltage regulator circuit connected to the base of said second transistor for overriding said oscillator circuit to turn off said first transistor when the voltage on said high voltage output line exceeds five volts.

33. The steam system management apparatus of claim 32, wherein said regulator circuit includes a third transistor connected between said high voltage output line and the base of said second transistor for turning said second transistor on and off, and a balancing circuit for controlling said third transistor having a Zener diode regulator and a resistor connected in series on a first shunt line between the high voltage output line behind said rectifier diode and ground for maintaining a precision, nonvarying voltage on said first shunt line, a voltage splitter line between said high voltage output line behind said rectifier and ground having two resistors connected in series therein, with the value of these two resistors being sized to split the voltage in such a manner that when there is the desired five volts on the hgh voltage output line, the voltage between these two resistors is equal to the precision voltage on said first shunt line, a transistor control line extending from the base of said third transistor to ground and having a fourth transistor therein with its base connected to said voltage splitter line between said two resistors therein and a bias line with a resistor therein connected between said high voltage output line behind said rectifier and said transistor control line between said third and fourth transistors, and a second shunt line extending from said high voltage output line behind said rectifier to ground and having a fifth transistor therein with its base connected to said first shunt line where said precision voltage is maintained.

34. In a steam system having a valve therein for opening said system to the outside, a method for controlling the air content in the steam system, comprising the steps of:

positioning a thermal-electric generator capable of generating electric power thermionically from heat transfer therethrough adjacent a heat conducting wall of said steam system;

connecting an electric solenoid to said valve for opening and closing said valve;

operating said solenoid with the electric power generated by said thermal-electric generator to open said valve to purge air from the steam system and closing said valve to terminate the purge;

determining the thermal transfer efficiency E* by providing said thermal-electric generator in a form that produces an electric potential in proportion to the quantity of heat conducted therethrough;

positioning a first temperature sensing device capable of outputting a voltage in relation to temperature in the steam system adjacent said heat conducting wall;

positioning a second temperature sensing device capable of outputting a voltage in relation to temperature at the side of said thermal-electric generator opposite said heat conducting wall;

dividing the magnitude of voltage produced by said thermal-electric generator by the difference between the respective magnitudes of the voltage outputs of said first and second temperature sensors, comparing said thermal transfer efficiency E* with a predetermined reference thermal transfer efficiency E*; and actuating said solenoid to open said valve to purge air from the steam sytem when the actual thermal transfer efficiency varies a predetermined amount from the reference thermal transfer efficiency E*.

35. The method of claim 34, including the step of establishing said thermal transfer efficiency reference e*$_{REF}$ corresponding to an acceptable amount of air in the steam system by opening said valve to purge air from the system, and, during the purge, using a microprocessor to continuously monitor the voltage outputs of the thermal-electric generator and the two temperature sensors and to continuously calculate the thermal transfer efficiency E* of the steam system during the purge, and to also calculate the rate of change of the thermal transfer efficiency E*, continuously comparing the rate of change of the thermal transfer efficiency E* with a predetermined maximum rate of change corresponding with an acceptable amount of air in the steam system, and, when the actual rate of change decreases to the predetermined maximum acceptable rate of change, outputting a signal to actuate said solenoid to close the valve and terminate the purge, and set the actual thermal transfer efficiency E* as the reference thermal transfer efficiency E*$_{REF}$.

36. The method of claim 35, including the steps of connecting a reservoir to said steam system for collecting and retaining condensate, positioning said valve at the bottom of said reservoir, positioning an upper liquid level sensor switch near the top of said reservoir and a lower liquid level sensor switch near the bottom of the reservoir, and connecting said level sensor switches to said electrical power from said thermal electric generator and said solenoid to actuate said solenoid to open said valve when the condensate level in the reservoir reaches the upper sensor switch and to close said valve when the condensate level falls to said lower sensor switch and the thermal transfer efficiency E* is still within the acceptable band of variation from E*$_{REF}$.

37. The method of claim 36, including the steps of utilizing the microprocessor to also continuously monitor the time required for the reservoir to fill with condensate from the low level sensor to the upper level sensor and to dump the condensate by connecting the electric circuit that powers the solenoid also to said microprocessor to input a signal to the microprocessor when the solenoid is turned on and off to actuate said valve closed and open, to use the volume of the reservoir and time of fill to calculate the rate of condensate flow into the reservoir, and utilizing the rate to calculate the volume of the next succeeding dump by multiplying the rate of inflow times the time of the dump and adding the product to the volume of the reservoir, and to output a signal to actuate a totalizer to register the volume of the dumps.

38. The method of claim 37, including the steps of monitoring the times the solenoid is actually actuated to open the valve and to close the valve during condensate dumps and air purges and comparing those times with predetermined acceptable reference times for these modes, and outputting a signal to actuate an alarm whenever any of these actual times exceed the predetermined reference times.

39. A method of controlling the amount of entrained air in a steam system, comprising the steps of:
 positioning a thermal-electric generator, which is adapted to produce electricity thermionically from heat in relation to the quantity of heat flowing therethrough, adjacent a heat conducting wall of a steam system;
 positioning a first temperature sensor, which is adapted to output an electric signal in relation to temperature, adjacent said thermal-electric generator on a side thereof opposite the heat conducting wall of the steam system;
 dividing the electric output of the thermal-electric generator by the output of the first temperature sensor and comparing the dividend with a predetermined reference value corresponding to an acceptable amount of air in the steam system; and
 opening a valve in the steam system to the outside of the steam system to purge excess air from the steam system when said dividend varies a predetermined amount from said reference value corresponding to an unacceptable amount of air in the steam system.

40. The method of claim 39, including the steps of:
 determining said reference value by opening said valve to purge air from the steam system;
 continuously sampling the electrical outputs of the thermal-electric generator and the first temperature sensor and dividing the electrical output of the thermal electric generator by the electrical output of the first temperature sensor, and continuously comparing each dividend with the preceding dividend at unit time intervals to determine the rate of change of each successive dividend;
 continuously comparing the rate of change of the successive dividends with a predetermined reference rate of change corresponding to an acceptable amount of air in the steam system; and
 closing the valve when the actual rate of change of the dividends decreases to the reference rate of change to terminate the purge.

41. The method of claim 40, including the step of closing said valve only after the rate of change of the dividends does not exceed the reference rate of change for a predetermined period of time corresponding to stabilized conditions of air content, temperature, and pressure of the steam system.

42. A method of controlling the amount of entrained air in a steam system, comprising the steps of:
 positioning a thermal-electric generator, which is adapted to produce electricity thermionically from heat, adjacent a heat-conducting wall of a steam system;
 positioning a first heat sensor, which is adapted to output an electric signal in relation to temperature, adjacent said thermal-electric generator on a side thereof opposite the heat-conducting wall of the steam system;
 positioning a first heat sensor, which is adapted to output an electric signal in relation to temperature, adjacent said thermal-electric generator on a side thereof opposite the heat-conducting wall of the steam system;
 positioning a second heat sensor, which is adapted to output an electric signal in relation to temperature, adjacent said heat conducting wall of said steam system;
 dividing the electric output of the thermal-electric generator by the difference between the electric outputs of the first and second heat sensors and comparing the dividend with a predetermined reference value corresponding to an unacceptable amount of air in the steam system; and
 opening a valve in the steam system to the outside of the steam system to purge excess air from the steam system when said dividend varies a predetermined amount from said reference value corresponding to an unacceptable amount of air in the steam system.

43. Steam system management apparatus, comprising:
 a reservoir having an inlet adapted for connection to a steam distribution and an outlet;
 pilot actuated valve means for opening and closing said outlet, said pilot actuated valve means including pressure actuated main valve means positioned in said outlet for selectively opening and closing said outlet, pressure distribution means for directing a fluid under pressure to said main valve means, and pilot valve means in said pressure distribution means for selectively applying and releasing pressure on said main valve means;
 pilot control means for actuating said pilot valve means, including a moveable armature connected to said pilot valve means, an electric solenoid adjacent said armature for moving said armature in one direction, spring bias means connected to said armature for moving said armature in the opposite direction, and solenoid actuator means electrically connected to said thermal electric generator means and said solenoid for selectively energizing and deenergizing said solenoid, and
 liquid level sensing means in said reservoir for sensing when said reservoir is full of liquid and when it is empty of liquid, said liquid level sensing means being connected to said solenoid actuator means to energize said solenoid to close said main valve means when said reservoir is empty of liquid and to deenergize said solenoid to open said main valve means when said reservoir is full of liquid.

44. The steam system management apparatus of claim 43, wherein said solenoid actuator means includes first relay means for closing an electric circuit to energize said solenoid when said reservoir is empty of liquid and for opening the electric circuit to deenergize said solenoid when said reservoir is full of liquid.

45. The steam system management apparatus of claim 44 wherein said pilot control means includes air detection means for detecting the amount of air in the steam system, said air detection means being connected to said solenoid actuator means to deenergize said solenoid to open said main valve means for purging the air from the steam system when a predetermined maximum acceptable amount of air is detected in the steam system and to energize said solenoid to close said main valve means to terminate the air purge when a predetermined minimum amount of air is detected in the steam system.

46. The steam system management apparatus of claim 44, wherein said liquid level sensing means includes a lower level switch positioned at the bottom of the reservoir for actuating said first relay means to close the electric circuit to said solenoid and an upper level switch positioned at the top of the reservoir for actuating said first relay means to open the electric circuit to said solenoid.

47. The steam system management apparatus of claim 46, wherein said lower and upper level switches are magnetically operated reed switches and said liquid level sensing means also includes a float in said reservoir with a magnet positioned therein, said float and magnet being adapted to move into a position adjacent said lowr reed switch when said reservoir is empty of liquid and to move into a position adjacent said upper reed switch when said reservoir is full of liquid.

48. The steam system management apparatus of claim 47, wherein said liquid level sensing means includes an elongated vertical tube extending from the top to the bottom of said reservoir, said upper and lower reed switches being positioned inside said tube and said float and magnet being slidably positioned around the exterior surface of said tube.

49. Steam system management apparatus for steam systems having steam-containing components and heat transfer surfaces through which heat transfers from steam in the system, comprising:
a reservoir having an inlet for connecting said reservoir to a steam distribution system and an outlet;
valve means for opening and closing said outlet; and
air detection means for detecting the amount of air in the steam system, said air detection means being connected to said valve means to open said valve means for purging the air from the steam system when a predetermined maximum acceptable amount of air is detected in the steam system and to energize said solenoid to close said valve means to terminate the air purge when a predetermined minimum amount of air is detected in the steam system, said air detection means including heat transfer detection means positioned at a heat transfer surface for detecting heat transfer through the heat transfer surface.

50. The steam system management apparatus of claim 49, wherein said air detection means includes a thermal electric generator positioned with one side adjacent said inlet, heat sensor means adjacent the side of said thermal-electric generator that is opposite said inlet and which is adapted to output an electric signal in relation to the temperature at the position of the heat sensor means, the computer means for constantly calculating a thermal transfer efficiency value by dividing the electrical output of the thermal-electric generator by electrical output of the heat sensor means and for calculating the actual rate of thermal transfer efficiency change during the air purge and comparing the actual rate of thermal transfer efficiency change to a predetermined standard rate of thermal transfer efficiency change, and for constantly monitoring the actual thermal transfer efficiency of the steam system when air is not being purged and comparing the actual thermal transfer efficiency with a predetermined maximum acceptable percentage variation from the thermal transfer efficiency at the termination of the preceding air purge corresponding with the predetermined maximum acceptable amount of air in the steam system and outputting a signal to said valve means to open said outlet to start an air purge when the actual thermal transfer efficiency of the steam system varies at least as much as the predetermined maximum acceptable percentage variation from the thermal transfer efficiency at the termination of the preceding air purge.

51. The steam system management apparatus of claim 50, wherein said temperature measuring means is a thermistor which produces a continuous analog electrical output corresponding to the temperature of the fluids in the steam system, and said computer means includes an analog to digital converter for converting the analog output of the thermistor to digital data per predetermined time intervals and a digital computer processing unit operating system for performing the required algorithms, and the output of said computer means to said valve means is digital.

52. The steam system management apparatus of claim 50, including low level alarm means for alerting attending personnel of excessively long periods of the valve means being open.

53. The steam system management apparatus of claim 52, wherein said low level alarm means includes an output signal capable of being detected by a person's natural senses, an input signal to said computer means from said valve means when said outlet is opened, wherein said computer means is adapted to compare the time the outlet is opened with a predetermined standard time corresponding to the normal time interval between opening said outlet when said reservoir is full of liquid and closing said outlet when said reservoir is empty of liquid and outputting a signal to said low level alarm means when the outlet is opened for a time period longer than said predetermined standard time.

54. The steam system management apparatus of claim 53, wherein said alarm means includes a visual display.

55. The steam system management apparatus of claim 53, wherein said alarm means includes an electromagnetic signal transmitter, a receiver at a remote location, and an alarm signal generator at the remote location connected to the receiver.

56. Steam management system apparatus, comprising:
a reservoir having an inlet for connecting said reservoir to a steam system and an outlet;
valve means for opening and closing said outlet;
computer means for constantly monitoring the times the valve means remains open; and
alarm means for alerting attending personnel of excessively long periods of the valve means remaining open, said alarm means including an output signal capable of being detected by a person's natural senses, an input signal to said computer means from said valve means when said outlet is opened, wherein said computer means is adapted to compare the time the outlet is opened with a predetermined standard time corresponding to the normal time interval between opening of said outlet when said reservoir is full of liquid and closing said outlet when said reservoir is empty of liquid and outputting a signal to said low level alarm means when the outlet is opened for a time period longer than said predetermined standard time.

57. In a steam system having a valve therein for opening said system to the outside, a method for controlling the air content in the steam system, comprising the steps of:
positioning a thermal-electric generator capable of generating electric power thermionically from heat transfer therethrough adjacent a heat conducting wall of said steam system;
connecting a reservoir to said steam system for collecting and retaining condensate;
positioning a solenoid valve at the bottom of said reservoir;
positioning an upper liquid level sensor switch near the top of said reservoir and a lower liquid level sensor switch near the bottom of the reservoir; and
connecting said level sensor switches to said electrical power from said thermal electric generator and said solenoid valve to actuate said solenoid valve to open said solenoid valve when the condensate level in the reservoir reaches the upper sensor switch and to close said solenoid valve when the condensate level falls to said lower sensor switch.

58. The method of claim 57, including the steps of utilizing the microprocessor to also continuously monitor the time required for the reservoir to fill with condensate from the low level sensor to the upper level sensor and to dump the condensate by connecting the electric circuit that powers the solenoid also to said microprocessor to input a signal to the microprocessor when the solenoid is turned on and off to actuate said valve closed and open, to use the volume of the reservoir and time of fill to calculate the rate of condensate flow into the reservoir, and utilizing that rate to calculate the volume of the next succeeding dump by multiplying the rate of inflow times the time of the dump and adding the product to the volume of the reservoir, and to output a signal to actuate a totalizer to register the volume of the dumps.

59. The method of claim 58, including the steps of monitoring the times the solenoid is actually actuated to open the valve and to close the valve during condensate dumps and air purges and comparing those times with predetermined acceptable reference times for these modes, and outputting a signal to actuate an alarm whenever any of these actual times exceed the predetermined reference times.

* * * * *